(12) United States Patent
McGowan et al.

(10) Patent No.: US 10,926,828 B2
(45) Date of Patent: Feb. 23, 2021

(54) FOOT-DECK-BASED VEHICLES HAVING ADJUSTABLE STEERING CHARACTERISTICS

(71) Applicant: YVOLVE SPORTS LTD., Dublin (IE)

(72) Inventors: John McGowan, Dublin (IE); Barry Whyte, Curragh (IE); Shane Connaughton, Dublin (IE); Darrell Merino, Dublin (IE)

(73) Assignee: YVOLVE SPORTS LIMITED, Dublin (IE)

( * ) Notice: Subject to any disclaimer, the term of this patent is extended or adjusted under 35 U.S.C. 154(b) by 0 days.

(21) Appl. No.: 16/694,224

(22) Filed: Nov. 25, 2019

(65) Prior Publication Data

US 2020/0198723 A1  Jun. 25, 2020

Related U.S. Application Data

(62) Division of application No. 16/324,307, filed as application No. PCT/IB2017/055043 on Aug. 21, 2017, now Pat. No. 10,486,765.

(Continued)

(51) Int. Cl.
*B62K 5/05* (2013.01)
*B62K 21/10* (2006.01)
(Continued)

(52) U.S. Cl.
CPC .............. *B62K 21/10* (2013.01); *B62K 3/002* (2013.01); *B62K 5/05* (2013.01); *B62K 5/08* (2013.01)

(58) Field of Classification Search
CPC .......... B62K 21/10; B62K 5/05; B62K 3/002; B62K 5/08
See application file for complete search history.

(56) References Cited

U.S. PATENT DOCUMENTS 8,696,000 B1    4/2014  Chen
2011/0042913 A1*  2/2011  Landau ................ A63C 17/012
                                                     280/87.042

(Continued)

FOREIGN PATENT DOCUMENTS

CN    204197193 U    11/2015
DE     20103486 U1    5/2001
(Continued)

OTHER PUBLICATIONS

PCT/IB2017/055043, International Search Report & Written Opinion, dated Nov. 24, 2017, European Patent Office.

*Primary Examiner* — John D Walters
*Assistant Examiner* — James J Triggs
(74) *Attorney, Agent, or Firm* — Millman IP Inc.

(57) ABSTRACT

A foot-deck-based vehicle having an adjustable steering characteristic is provided. The foot-deck-based vehicle has a foot-deck with a front end, a rear end, and at least one rear wheel proximal to the rear end. A front wheel assembly is coupled to the foot-deck proximal to the front end to pivot relative to the foot-deck about a front wheel assembly pivot axis that is at an acute angle to a vertical axis when the foot-deck-based vehicle is upright. The front wheel assembly includes at least one front wheel rotatably coupled to a front wheel support. A steering characteristic adjustment structure adjustably controls a steering characteristic of the foot-deck-based vehicle.

8 Claims, 20 Drawing Sheets

Related U.S. Application Data

(60) Provisional application No. 62/502,187, filed on May 5, 2017, provisional application No. 62/377,147, filed on Aug. 19, 2016.

(51) Int. Cl.
  *B62K 3/00* (2006.01)
  *B62K 5/08* (2006.01)

(56) References Cited

U.S. PATENT DOCUMENTS

| | | |
|---|---|---|
| 2015/0122566 A1 | 7/2015 | Constien |
| 2018/0185739 A1* | 7/2018 | McGowan ............. A63C 17/04 |

FOREIGN PATENT DOCUMENTS

| | | |
|---|---|---|
| DE | 202013100380 U1 | 3/2013 |
| EP | 2695804 A2 | 2/2014 |
| WO | 2014146580 A1 | 9/2014 |

* cited by examiner

FOOT-DECK-BASED VEHICLES HAVING ADJUSTABLE STEERING CHARACTERISTICS

CROSS-REFERENCE TO RELATED APPLICATIONS

This application is a divisional application of U.S. application Ser. No. 16/324,307 filed Feb. 8, 2019 which is a national stage entry application of International Application No. PCT/IB2017/055043 filed Aug. 21, 2018 which claims priority to U.S. Provisional Patent Application No. 62/377,147 filed Aug. 19, 2016, and to U.S. Provisional Patent Application No. 62/502,187 filed May 5, 2017, the contents of all of which are incorporated herein in their entirety.

FIELD

The specification relates generally to human-operated vehicles. In particular, the following relates to foot-deck-based vehicles having adjustable turning characteristics.

BACKGROUND OF THE DISCLOSURE

Foot-deck-based vehicles such as scooters are a popular form of transport and recreation. Some of these foot-deck-based vehicles employ lean-to-steer mechanisms for enabling a rider standing on a foot-deck thereof to steer by shifting their center-of-gravity laterally. Such lean-to-steer mechanisms have a wheel axis (typically the front) that can pivot about an oblique axis and that is biased by a biasing element towards a position in which it is parallel with the foot-deck. The biasing force exerted by the biasing element determines how the wheel axis responds to shifting of a rider's center-of-gravity.

While this mode of steering can be very intuitive and preferable to an experienced rider, some riders, such as novice riders, may undergo difficulties in steering a scooter due to a lack of skill. There is a learning process during which a rider learns to shift their weight laterally an appropriate distance and with an appropriate speed to achieve a desired turning. During this process, a novice rider may shift their weight too far or too rapidly, or in other cases not far enough or not fast enough, leading to over or understeering.

Prior to production, the biasing element is selected based on the turning characteristics desired for the foot-deck-based vehicle. While a biasing element that exerts a relatively small biasing force may be suitable for a rider of a smaller weight, it may not be suitable for a larger rider. Similarly, a biasing element that exerts a relatively large biasing force may be suitable for a rider of a larger weight, it may not be suitable for a smaller rider. A mismatch between the rider's weight and skills and the biasing element may cause a novice rider to fall off the foot-deck-based vehicle because the foot-deck-based vehicle is turning more or less rapidly than anticipated, possibly causing the rider to sustain injuries.

Attempts at mitigating such risks have included implementing steering lock mechanisms in scooters to permit riders to lock out and unlock the steering capability of such scooters. However, a scooters configured to have locked out steering (i.e., configured to be capable of being driven in a straight line only) may be dangerous, depending on the terrain that may be available to a rider. For example, where the terrain includes hills, traffic, and other obstacles, a scooter configured to move in a straight line only may be dangerous in that it may not allow a rider to avoid or adjust for such obstacles.

Foot-deck-based vehicles designed for novice or otherwise less capable riders may use steering mechanisms that are relatively less responsive to a rider's steering movements, to reduce a risk of abrupt or otherwise dangerous steering motions that may cause a novice rider to fall or to fail to avoid an obstacle. However, such foot-deck-based vehicles may have disadvantages. For example, where a novice rider uses such a foot-deck-based vehicle regularly and with time becomes more advanced, he or she may desire a vehicle having scooter may become insufficiently interesting to the rider and the rider may need to buy a new scooter to remain entertained.

SUMMARY OF THE DISCLOSURE

In one aspect, there is provided a foot-deck-based vehicle having an adjustable steering characteristic, the foot-deck-based vehicle having a foot-deck with a front end, a rear end, and at least one rear wheel proximal to the rear end, comprising a front wheel assembly coupled to the foot-deck proximal to the front end to pivot relative to the foot-deck about a front wheel assembly pivot axis that is at an acute angle to a vertical axis when the foot-deck-based vehicle is upright, the front wheel assembly comprising at least one front wheel rotatably coupled to a front wheel support, and a centering structure comprising at least one resilient torsion member that, when torsioned as a result of pivoting of the front wheel assembly, exerts a centering force biasing the front wheel assembly to a neutral steering position, the centering structure being adjustable by at least one of adding, removing, and replacing at least one of the at least one resilient torsion members.

The at least one resilient torsion member can couple the front wheel assembly to the foot-deck. Each of the at least one resilient torsion member can comprise a non-cylindrical recess that resists rotation relative to a peripheral surface of the resilient torsion member, generating a torsional force urging the non-cylindrical recess back to an initial angular orientation relative to the peripheral surface.

In another aspect, there is provided a foot-deck-based vehicle having an adjustable steering characteristic, the foot-deck-based vehicle having a foot-deck with a front end, a rear end, and at least one rear wheel proximal to the rear end, comprising a front wheel assembly coupled to the foot-deck proximal to the front end to pivot relative to the foot-deck about a front wheel assembly pivot axis that is at an acute angle to a vertical axis when the foot-deck-based vehicle is upright, the front wheel assembly comprising at least one front wheel rotatably coupled to a front wheel support, and a centering structure comprising a resilient torsion member that, when torsioned as a result of pivoting of the front wheel assembly, exerts a centering force biasing the front wheel assembly to a neutral steering position, the centering structure being adjustable by adjusting a length of the resilient torsion member coupling the front wheel assembly to the foot-deck.

In a further aspect, there is provided a foot-deck-based vehicle having an adjustable steering characteristic, the foot-deck-based vehicle having a foot-deck with a front end, a rear end, and at least one rear wheel proximal to the rear end, comprising a front wheel assembly coupled to the foot-deck proximal to the front end to pivot relative to the foot-deck about a front wheel assembly pivot axis that is at an acute angle to a vertical axis when the foot-deck-based vehicle is upright, the front wheel assembly comprising at least one front wheel rotatably coupled to a front wheel support, and a centering structure comprising at least one resilient torsion member that, when torsioned as a result of pivoting of the front wheel assembly, exerts a centering force biasing the front wheel assembly to a neutral steering position, the centering structure being adjustable by pre-torsioning the at least one resilient torsion member.

The at least one resilient torsion member can comprise at least one coil spring.

In yet another aspect, there is provided a foot-deck-based vehicle having an adjustable steering characteristic, the foot-deck-based vehicle having a foot-deck with a front end, a rear end, and at least one rear wheel proximal to the rear end, comprising a front wheel assembly coupled to the foot-deck proximal to the front end to pivot relative to the foot-deck about a front wheel assembly pivot axis that is at an acute angle to a vertical axis when the foot-deck-based vehicle is upright, the front wheel assembly comprising at least one front wheel rotatably coupled to a front wheel support, and a centering structure comprising at least one resilient tension member that, when extended as a result of pivoting of the front wheel assembly, exerts an adjustable centering force biasing the front wheel assembly to a neutral steering position.

The centering structure can enable adjustment of a force-displacement relationship of the at least one resilient tension member.

The centering structure can enable adjustment of the number of the at least one resilient tension member.

The centering structure can further comprise a centering force adjustment structure that adjusts a moment arm upon which the at least one resilient tension member acts.

In still yet another aspect, there is provided a foot-deck-based vehicle having an adjustable steering characteristic, the foot-deck-based vehicle having a foot-deck with a front end, a rear end, and at least one rear wheel proximal to the rear end, comprising a front wheel assembly coupled to the foot-deck proximal to the front end to pivot relative to the foot-deck about a front wheel assembly pivot axis that is at an acute angle to a vertical axis when the foot-deck-based vehicle is upright, the front wheel assembly comprising a first front wheel and a second front wheel rotatably coupled to a front wheel support, the first front wheel being spaced apart laterally from the second front wheel, and a pitch adjustment structure configured to enable adjustment of a pitch of the front wheel assembly pivot axis relative to the vertical axis when the foot-deck-based vehicle is upright.

The pitch adjustment structure can comprise a pivotable joint enabling the front wheel assembly to pivot relative to the foot-deck about a pitch pivot axis that is generally horizontal and perpendicular to a longitudinal axis of the foot-deck when the foot-deck-based vehicle is upright.

The pivotable joint can be releasably lockable in one of a set of discrete pivot orientations.

The pivot joint can comprise at least one first barrel section coupled to the foot-deck and generally coaxial to the pitch pivot axis, the at least one first barrel section having a set of features on an inside surface thereof, at least one second barrel section coupled to the front wheel assembly and generally coaxial to the pitch pivot axis when the front wheel assembly is coupled to the foot-deck, the at least one second barrel section having a set of features on an inside surface thereof, and at least one locking member configured to be releasably lockably inserted through the at least one first barrel section and the at least one second barrel section to prevent pivoting of the front wheel assembly pivot axis relative to the foot-deck.

In another aspect, there is provided a foot-deck-based vehicle having an adjustable steering characteristic, the foot-deck-based vehicle having a foot-deck with a front end, a rear end, and at least one rear wheel proximal to the rear end, comprising a front wheel assembly coupled to the foot-deck proximal to the front end to pivot relative to the foot-deck about a front wheel assembly pivot axis, the front wheel assembly comprising at least one front wheel rotatably coupled to a front wheel support, and a pivot range control structure adjustably controlling an effective pivot range of the front wheel assembly about the front wheel assembly pivot axis.

The pivot range control structure can comprise at least one adjustable pivot-limiting structure extending from one of the front end of the foot-deck and the front wheel assembly and inhibiting pivoting of the front wheel assembly about the front wheel assembly pivot axis beyond the pivot range.

The pivot range control structure can comprise at least one adjustable roll-limiting member extending from one of the front end of the foot-deck and the front wheel assembly and inhibiting rolling of the foot-deck relative to a travel surface upon which the foot-deck-based vehicle is situated.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

Figure 1:
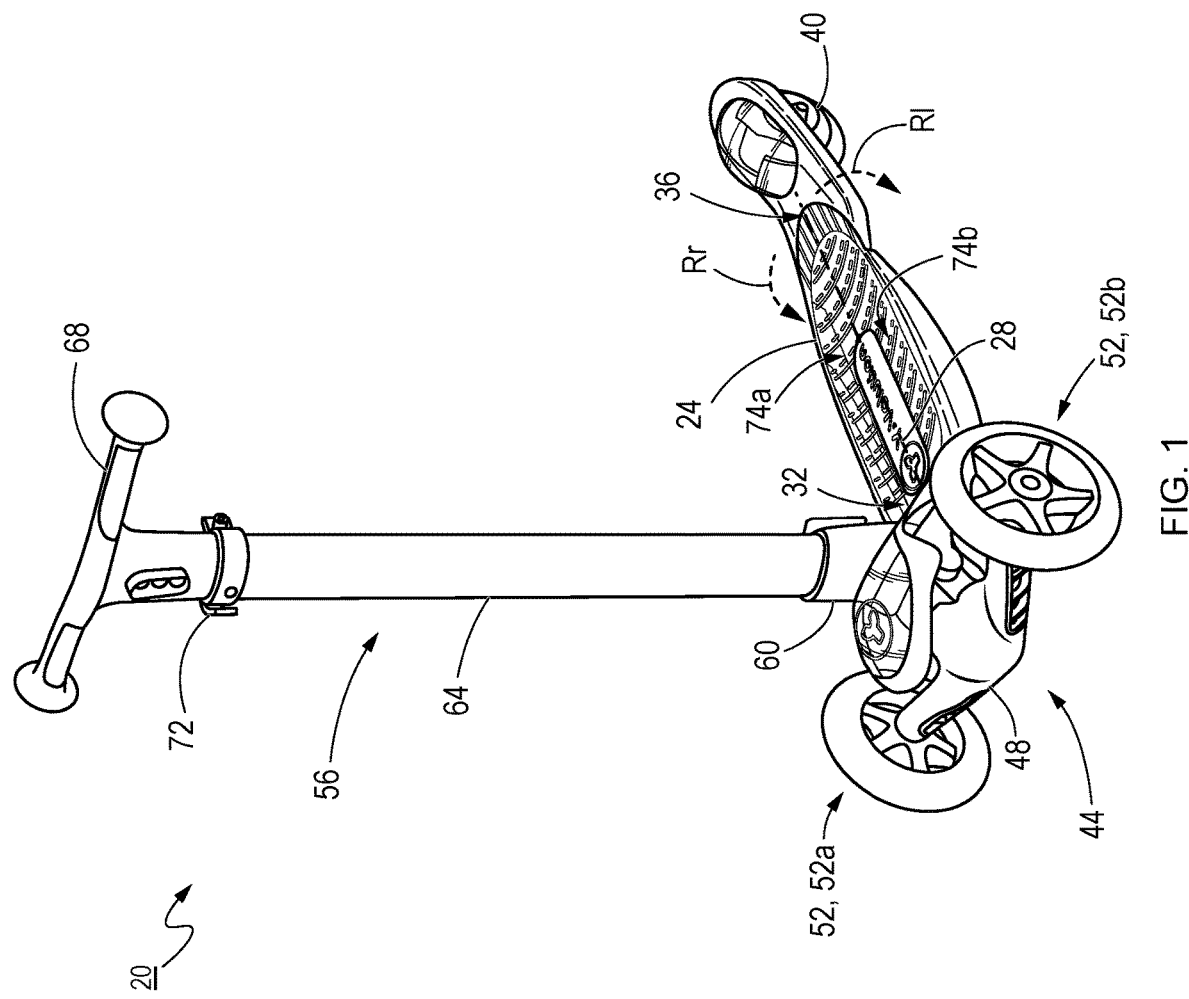
FIG. 1 is an isometric view of a foot-deck-based vehicle that is, in particular, a scooter in accordance with an embodiment.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Examples of systems, devices, assemblies, apparatuses, and methods are described below. No example described below limits any subject matter claimed in this patent application. The claims in this patent application may cover mechanical devices, assemblies, methods, and apparatuses that differ from those described below. The subject matter claimed in this patent application is not limited to systems, devices, assemblies, apparatuses, and methods having all of the features of any one embodiment described below. Patentable subject matter described below that is not claimed in this patent application may be claimed in another patent or other application for the protection of intellectual property in the subject matter.

Foot-deck-based vehicles that have adjustable steering characteristics are provided herein. The foot-deck-based vehicles have a foot-deck with a front end, a rear end, and at least one rear wheel proximal to the rear end. Additionally, the foot-deck-based vehicles have a front wheel assembly coupled to the foot-deck proximal to the front end to pivot relative to the foot-deck about a front wheel assembly pivot axis. The front wheel assembly includes at least one front wheel rotatably coupled to a front wheel support. A steering characteristic adjustment structure controls a steering characteristic of the foot-deck-based vehicle.

Steering characteristics can include, for example, the resistance of a steering mechanism to deviating from a neutral (central, or straight) steering position, the minimum turning radius which is correlated to the pivot range of the steering mechanism, and a roll range in the case of lean-to-steer foot-deck-based vehicles.

FIG. 1 shows a foot-deck-based vehicle in the form of a scooter 20 having an adjustable steering characteristic in accordance with an embodiment. The scooter 20 has a foot-deck 24 that has a central longitudinal axis 28 along which the foot-deck 24 extends, a front end 32 and a rear end 36. A single rear wheel 40 is positioned proximal to the rear end 36 of the foot-deck 24.

A front wheel assembly 44 is pivotally coupled to the foot-deck 24 proximal the front end 32 to pivot relative to the foot-deck about a front wheel assembly pivot axis. The front wheel assembly 44 includes a front wheel support in the form of a hanger 48 having a pair of front wheels 52a, 52b (collectively, front wheels 52) that are rotatably coupled to the hanger 48 and are spaced laterally apart.

A handlebar assembly 56 extends generally vertically from a top surface of the foot-deck 24 when the scooter 20 is upright. The handlebar assembly 56 includes a handlebar assembly base 60 that is secured to the foot-deck 24, a handlebar post 64 that is fitted into and secured to the handlebar assembly base 60 via any suitable method, such as bonding, clamping, etc. A handlebar member 68 has a stem that is slidably received within the handlebar post 64 and can be clamped via a quick-release clamp 72 at any position along a range, thereby allowing the handlebar member 68 to be adjusted in height as desired for a rider.

The scooter 20 is a lean-to-steer type vehicle. Steering is achieved by a rider by shifting their center-of-gravity laterally left or right of the central longitudinal axis 28. Thus, the handlebar assembly 56 is provided for the safety of a rider and not to directly steer the scooter 20. Due to the configuration of the scooter 20 described herein, a shift in a rider's center-of-gravity to a right lateral side 74a of the foot-deck 24 causes the foot-deck 24 to roll in a direction Rr and the front wheel assembly 44 to pivot right (i.e., clockwise, when viewed from a rider's perspective on the foot-deck 24), causing the scooter 20 to turn right. Similarly, a shift in a rider's center-of-gravity to a left lateral side 74b of the foot-deck 24 causes the foot-deck 24 to roll in a direction Rl and the front wheel assembly 44 to pivot left (i.e., counter-clockwise, when viewed from a rider's perspective on the foot-deck 24), causing the scooter 20 to turn left.

The sensitivity of the steering mechanism to rolling of the foot-deck 24 is a steering characteristic. Additionally, the resistance to the pivoting of the front wheel assembly 44 to turn is also a steering characteristic. Further, the pivot range of the front wheel support 44 is another steering characteristic.

Figure 2:
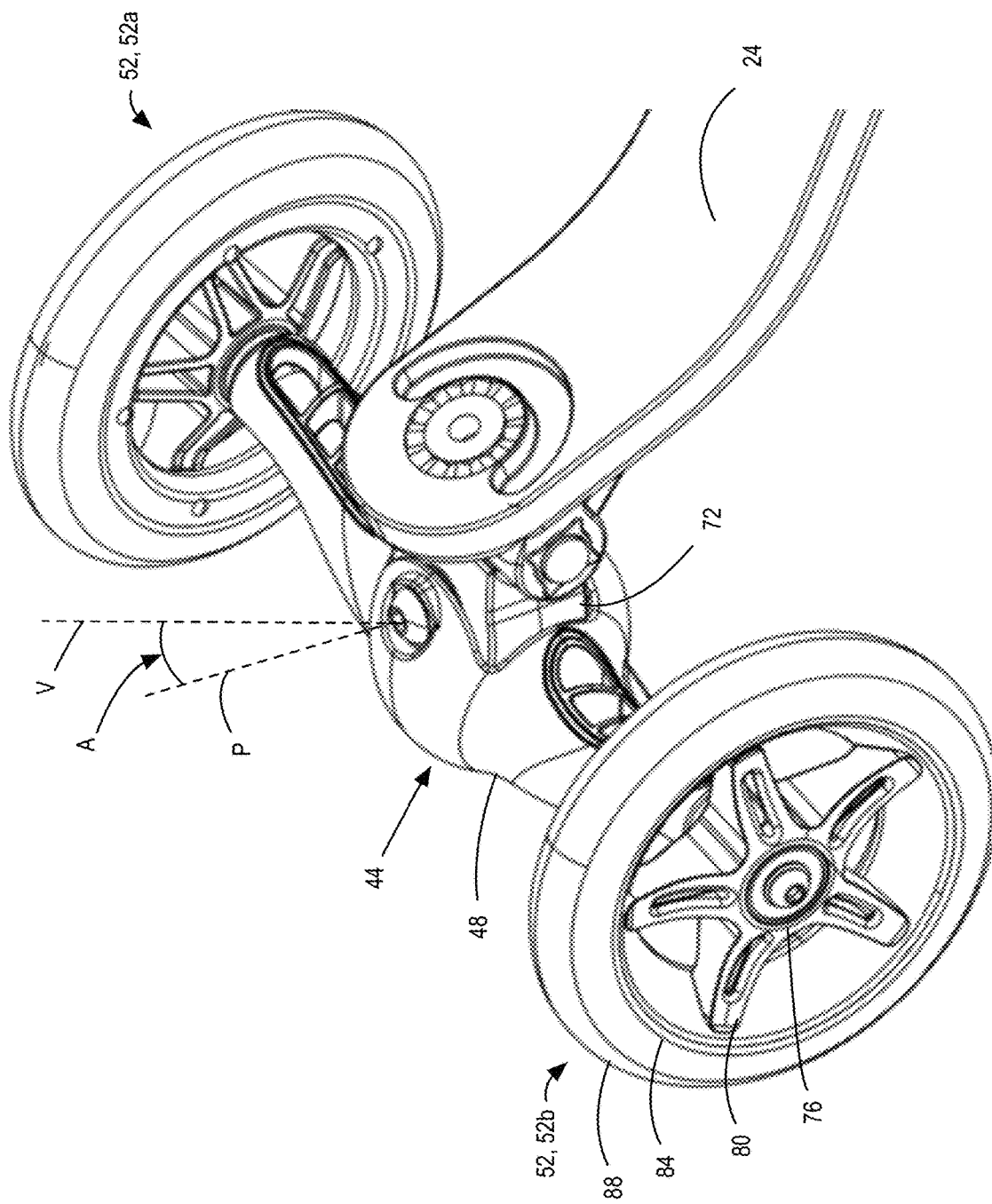
FIG. 2 is an isometric view of a front part of the scooter of FIG. 1 with the steering assembly removed.
Figure 3:
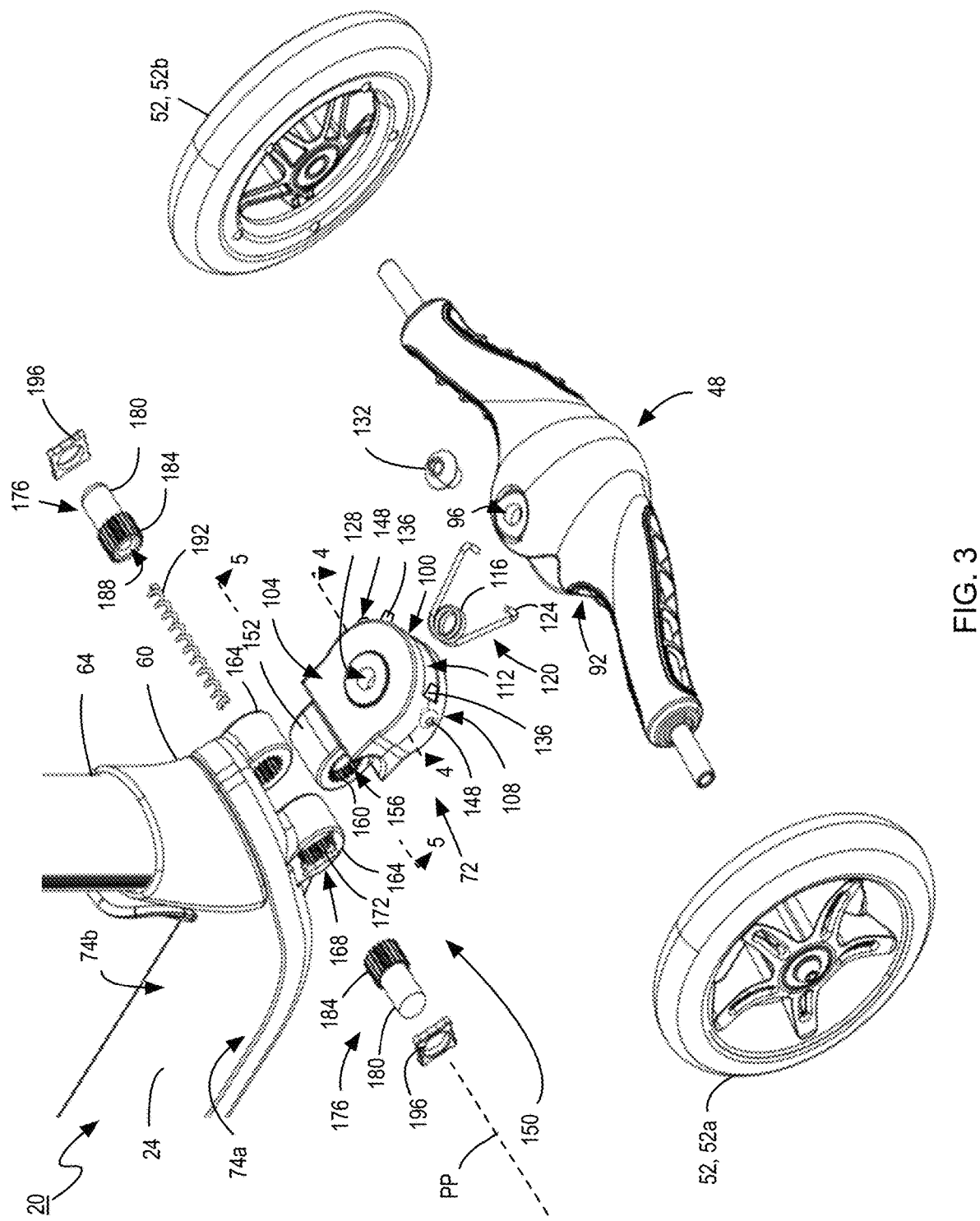
FIG. 3 is an exploded isometric view of the front part of the scooter of FIG. 1, showing a centering structure for biasing a front wheel assembly to a neutral steering position.

Referring now to FIGS. 1 to 3, the hanger 48 is elongated and spans between the two front wheels 52. The front wheels 52 are rotatably mounted on the hanger 48. The construction of the front wheels 52 can be any suitable construction for a foot-deck-based vehicle. In the illustrated embodiment, the front wheels 52 have a plastic hub 76 and spokes 80 supporting a rim 84. A tire 88 is fitted over the rim 84 and made of a suitable material such as polyurethane or the like.

The front wheel assembly 44 is coupled to the foot-deck 24 via a pivot coupler 72 that enables the front wheel assembly 44 to pivot about a front wheel assembly pivot axis P that is at an acute angle A to a vertical axis V when the scooter 20 is upright, thereby enabling a rider to steer the scooter 20 by leaning to a lateral side (either the right lateral side 74a or the left lateral side 74b) of the foot-deck 24 corresponding to the direction of the turn sought. In particular, the hanger 48 has a pivot coupler recess 92 that occupies most of a central part of the hanger 48. A pivot through-hole 96 passes fully through the hanger 48.

The pivot coupler 72 has a generally round front surface 100, a generally flat top surface 104, and a generally flat bottom surface 108 that is parallel to the top surface 104. A centering spring recess 112 in the front surface 100 receives a part of a steering characteristic adjustment structure in the form of an adjustable centering structure; in particular, a coil portion 116 of a resilient torsion member in the form of a centering spring 120, with biasing ends 124 that extend out of the centering spring recess 112. The centering spring 120 is a coil spring that generally resists being coiled and uncoiled, and maintains its characteristics during normal use over the expected lifetime of the scooter 20 due to its resilience. A generally central through-hole 128 passes through the top surface 104 and the bottom surface 108 of the pivot coupler 72.

During assembly, the biasing ends 124 of the centering spring 120 are inserted into the pivot coupler recess 92 of the hanger 48 and fitted against features therein. The coil portion 116 of the centering spring 120 is aligned with the centering spring recess 112 and the pivot coupler 72 is concurrently inserted inside of the pivot coupler recess 92 until the coil portion 116 is aligned with the central through-hole 128 of the pivot coupler 72 and the pivot through-hole 96 of the hanger 48. A nut 132 is inserted into the pivot through-hole 96 and a bolt (not shown) is inserted into the bottom of the pivot through-hole 94, through the central through-hole 128 of the pivot coupler 72 and the coil portion 116 of the centering spring 116, and fastened to the nut 132 to secure the hanger 48 to the pivot coupler 72. The front wheel assembly pivot axis P extends coaxially through the bolt and the nut 132.

As will be understood, the centering spring 120 is part of a centering structure that exerts an adjustable centering force on the front wheel assembly 44 when the front wheel assembly 44 is urged away from a neutral steering position to urge the front wheel assembly 44 to the neutral steering position. The centering force generated by the centering spring 120 is torsional as the centering spring 120 resists being coiled further or uncoiled, and the centering spring 120 is resilient in that it returns to its original state as shown in FIG. 3.

Figure 4:
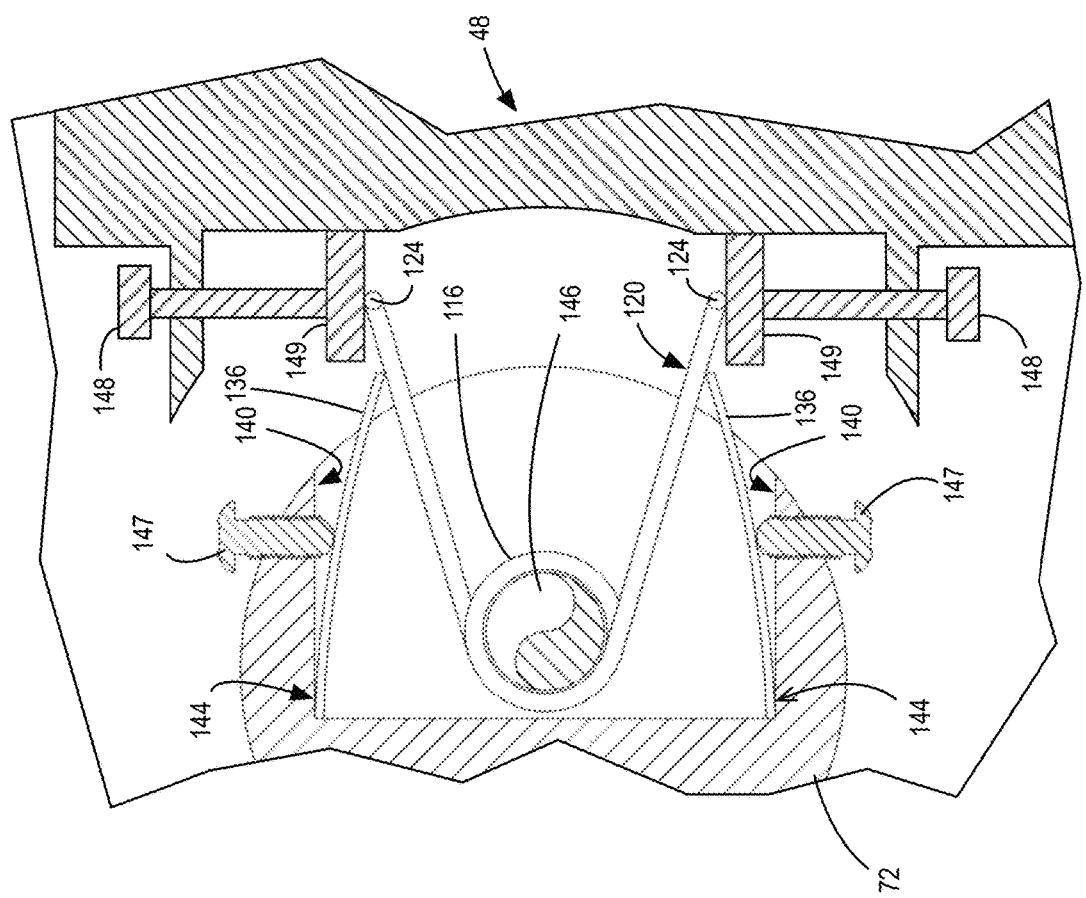
FIG. 4 is a top section view of a front hanger of the scooter of FIG. 1, taken along line 4-4 of FIG. 3, showing a portion of the centering structure.

Referring now to FIGS. 3 and 4, a first steering characteristic adjustment structure is shown. The steering characteristic adjustment structure is, in this case, a centering structure that includes a pair of pre-torsion leaves 136 that are positioned inside of the centering spring recess 112. The pre-torsion leaves 136 are held in place against side walls 140 of the centering spring recess 112 between the centering spring 120 and corners 144 of the centering spring recess 112. The coil portion 116 of the centering spring 120 is shown secured by a bolt 146 that is secured to the nut 132. Two adjustment screws 147 enable deflection of the pre-torsion leaves 136 away from the side walls 140 so that the pre-torsion leaves 136 impinge upon and deform the centering spring 120, thereby further coiling the centering spring 120 to pre-torsion it. Two compensation screws 148 position two abutment surfaces 149 of the hanger 48 that impinge upon the biasing ends 124 of the centering spring 120 when the hanger 48 is pivoted away from a neutral steering position. The compensation screws 148 are adjusted to compensate for the position of the biasing ends 124 after pre-torsioning via the adjustment screws 147 so that any pivoting of the hanger 48 causes one of the abutment surfaces 149 to impinge upon a corresponding one of the biasing ends 124 of the centering spring 120.

When the centering spring 120 is pre-torsioned, it exerts a greater centering force on the front wheel assembly 44. By adjusting both adjustment screws 147 and both compensation screws 148, the centering force of the centering spring 120 can be adjusted while maintaining a neutral steering position in which the torsion forces exerted by the centering spring 120 on the front wheel assembly 44 are laterally balanced.

The positions of the abutment surfaces define a pivot range of the front wheel assembly 44. Pivoting of the front wheel assembly 44 to one side torsions the centering spring 120 via movement of one of the biasing ends 124 thereof by the corresponding abutment surface 149. Once the corresponding abutment surface 149 has pivoted about the front wheel assembly pivot axis and encounters the other biasing end 124, the other biasing end 124, which is urged by the pre-torsion leaf 136 into a position, inhibits further pivoting of the front wheel assembly 44 via abutment with the corresponding abutment surface 149. In this manner, the centering structure also serves a pivot range control structure.

A pitch adjustment structure 150 of the scooter 20 is configured to enable adjustment of the pitch of the front wheel assembly pivot axis P relative to the vertical axis V when the scooter 20 is upright. The pitch of the front wheel assembly pivot axis P influences how responsive the steering of the scooter 20 is to rolling of the foot-deck 24. The pitch adjustment structure 150 includes a pivotable joint enabling the front wheel assembly 44 to pivot relative to the foot-deck 24 about a pitch pivot axis PP that is generally horizontal and perpendicular to the central longitudinal axis 28 of the foot-deck 24 when the scooter 20 is upright.

The pitch adjustment structure 150 includes a laterally aligned barrel section 152 of the pivot coupler 72 that is generally coaxial with the pitch pivot axis PP when the scooter 20 is assembled. The barrel section 152 has a smooth outer surface and a generally cylindrical hole 156 with a set of features on an inside surface thereof in the form of laterally extending teeth 160. Two laterally aligned barrel sections 164 extend forward from the front end 32 of the foot-deck 24 and are generally coaxial to the pitch pivot axis. Each of the two barrel sections 164 has a smooth outer surface and a generally cylindrical hole 168 with a set of features on an inside surface thereof in the form of laterally extending teeth 172 that correspond to the pattern of the laterally extending teeth 160 in the generally cylindrical hole 156 of the barrel section 152 of the pivot coupler 72. The two barrel sections 164 are spaced apart to enable the barrel section 152 of the pivot coupler 72 to fit between them. The patterns of laterally extending teeth 160 of the barrel sections 152, 164 enable the internal profile of the holes 156, 168 of the barrel sections 152, 164 respectively to align laterally at a discrete number of relative pivotal orientations.

The pivot adjustment structure 150 is releasably lockable in one of a set of discrete pivot orientations via at least one locking member that take the form in this embodiment of a pair of locking plungers 176 that are positioned within the holes 156, 168 of the barrel sections 152, 164. Each of the locking plungers 176 has a generally cylindrical body 180 with a toothed band 184 around a portion of its length. The toothed band 184 has teeth that correspond to the teeth 160, 172 of the holes 156, 168 of the barrel sections 152, 164 respectively so that when the locking plunger 176 is placed within the holes 156, 168, the teeth of the toothed band 184 mesh with those of the holes 156, 168 of the barrel sections 152, 164 respectively. Further, each locking plunger 176 has an end opening 188 adjacent the toothed band 184.

The locking plungers 176 are oriented within the holes 156, 168 such that the end openings 188 face one another. A separating spring 192 is positioned between the locking plungers 176 and is seated within the end openings 188 thereof. An apertured end-cap 196 is secured within an indentation on each external lateral wall of the barrel sections 152, 164. An aperture of the apertured end-cap 196 is dimensioned to permit the generally cylindrical body 180 to extend therethrough, but restrict the toothed band 184 from passing therethrough.

The centering force adjustment structure can further adjust the centering force on the front wheel assembly 44 by enabling more than one centering spring 120 to be deployed simultaneously, or by swapping the centering spring 120 for one with a different resistance to torsion. In this manner, the force-displacement relationship of the one or more centering springs can be adjusted.

Figure 5:
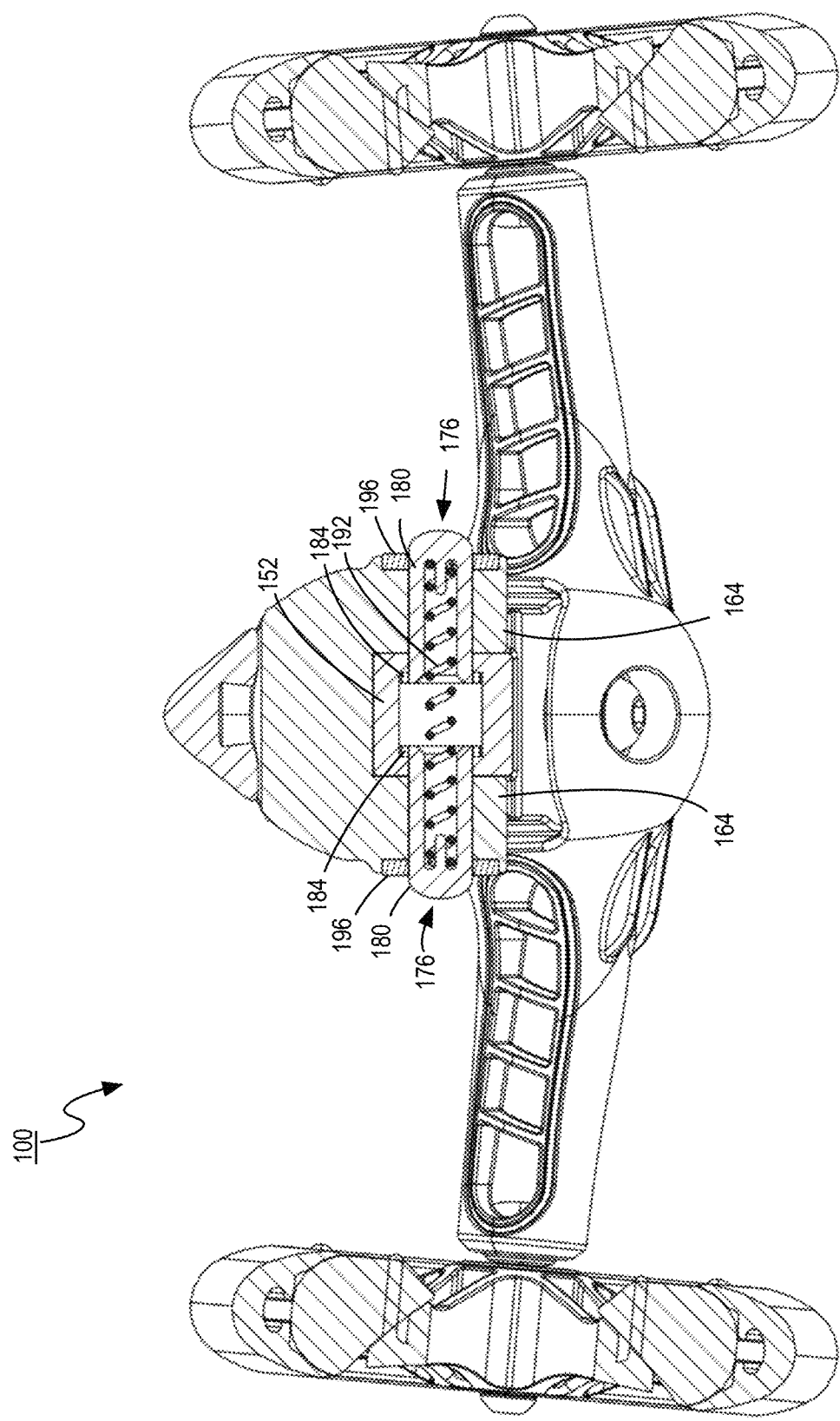
FIG. 5 is a rear section view of a part of the scooter along line 5-5 of FIG. 3.
Figure 6:
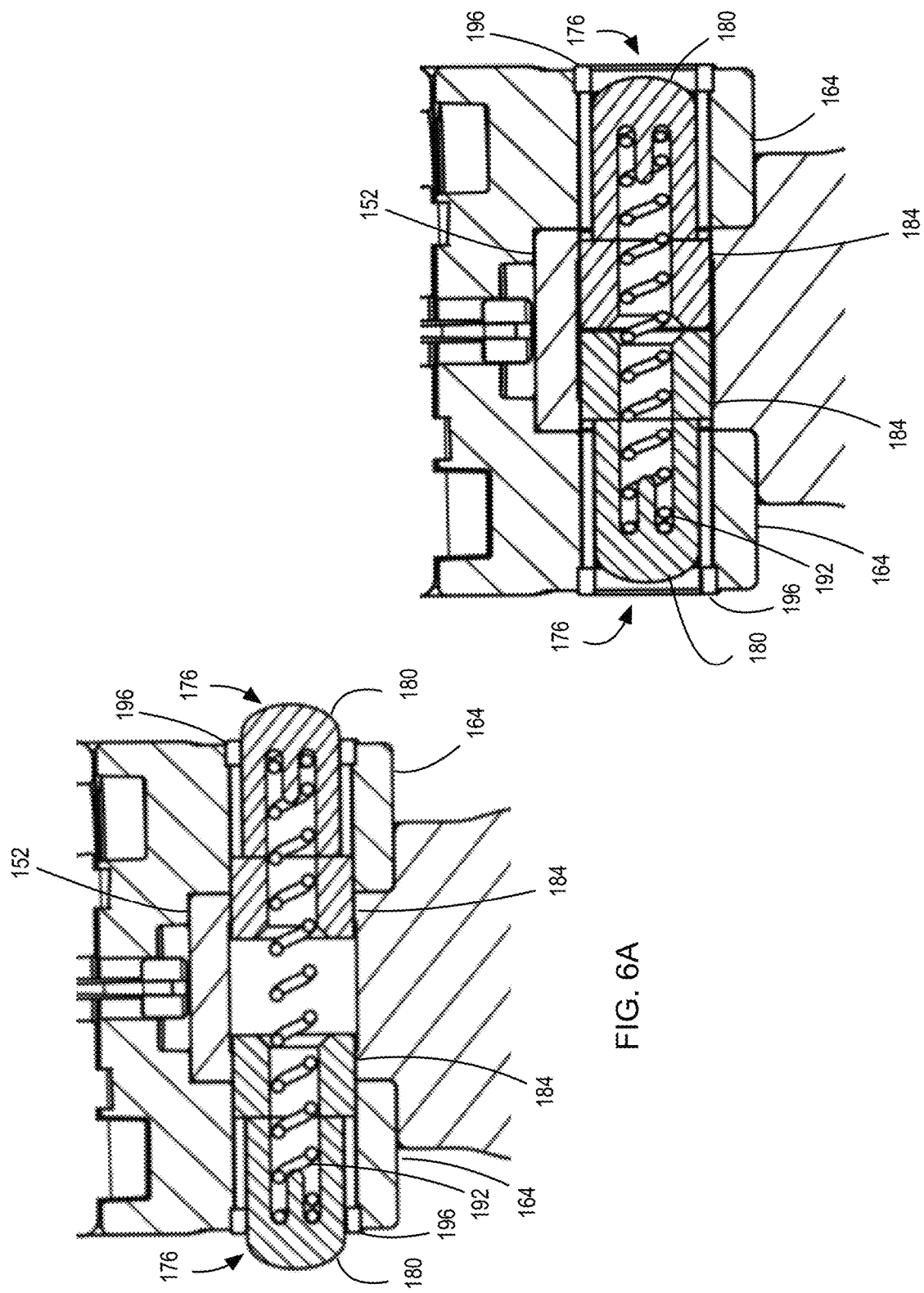
FIG. 6A is a rear section view of a pitch adjustment structure of the scooter of FIG. 1 taken along line 5-5 of FIG. 3, showing locking plungers thereof in a locking position.
FIG. 6B is a rear section view of the pitch adjustment structure of the scooter of FIG. 1 taken along line 5-5 of FIG. 3, showing the locking plungers thereof in a releasing position.

As shown in FIGS. 5 and 6A, when assembled, the separating spring 192 sits in the end openings 188 of the locking plungers 176 and urges the locking plungers 176 away from one another so that the generally cylindrical bodies 180 extend through the apertures of the aperture end-caps 196. In this position, the toothed bands 184 of the locking plungers 176 spans the barrel sections 152, 164 and extend into the barrel section 152 of the pivot coupler 72, thus engaging both the teeth 160 of the barrel section 152 and the teeth 172 of the barrel sections 164 and locking the pivotal orientation of the pivot coupler 72 relative to the foot-deck 24.

When it is desired to adjust the pitch of the front wheel assembly pivot axis P relative to the vertical axis V, the locking plungers 176 can be urged inwardly until the toothed bands 184 of the locking plungers 176 disengages the teeth 172 of the barrel sections 164 of the foot-deck 24 and they are both fully housed within the barrel section 152 of the pivot coupler 72, as shown in FIG. 6B. At this point, the pivot coupler 72 can be pivoted relative to the foot-deck 24. Upon achieving the desired pitch of the front wheel assembly pivot axis P relative to the vertical axis V, the locking plungers 176 are released, enabling the generally cylindrical bodies 180 thereof to be urged by the separating spring 192 through the aperture end-caps 196 and locking the pivotal orientation of the pivot coupler 72 relative to the foot-deck 24 and, thus, the pitch of the front wheel assembly pivot axis P relative to the vertical axis V.

Adjustment of the front wheel assembly pivot axis P relative to the vertical axis V modifies how sensitive the steering is in response to rolling of the foot-deck 24. The larger the angle is between the front wheel assembly pivot axis P and the vertical axis V, the more sensitive the steering is in response to rolling of the foot-deck 24.

Thus, by adjusting the adjustment screws 148, and/or by pivoting the pivot coupler 76 relative to the foot-deck 24, the sensitivity of the steering mechanism of the scooter 20 can be easily and safely adjusted.

Figure 7:
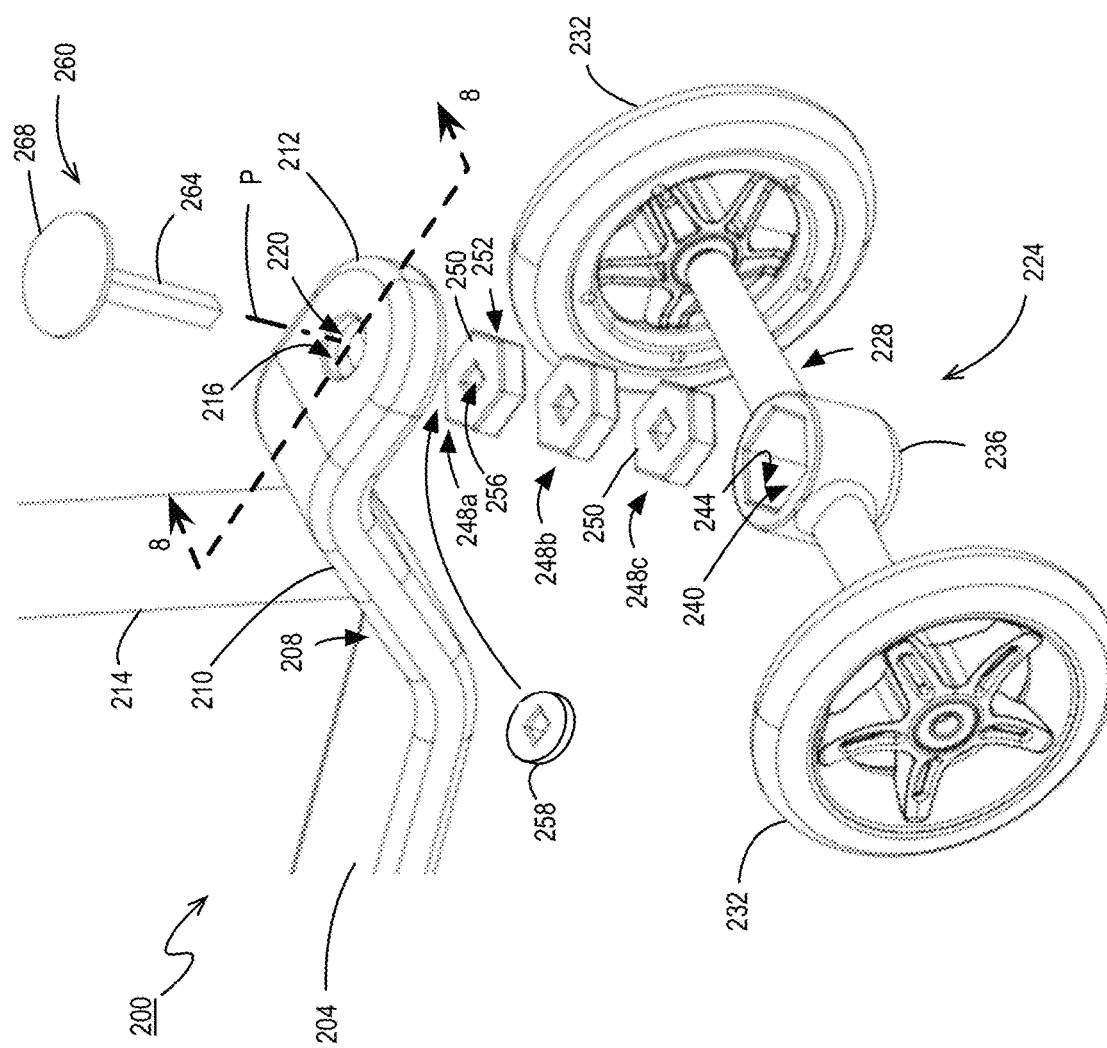
FIG. 7 is an exploded isometric view of a front part of a scooter having a centering structure including a plurality of resilient torsion members for biasing a front wheel assembly to a neutral steering position according to another embodiment.

FIG. 7 shows a front end of a scooter 200 in accordance with another embodiment. The scooter 200 has a foot-deck 204 with a rear end (not shown) and a front end 208. Extending from the front end 208 is an inclined section 210 leading to a declining coupling head 212. A handlebar assembly 214 extends upwardly from the inclined portion 210. The declining coupling head 212 has a cylindrical recess 216 on a top surface thereof, with a pivot through-hole 220 extending therethrough. The pivot through-hole 220 has a non-circular profile, square in the illustrated example, and defines a front wheel assembly pivot axis P.

A front wheel assembly 224 includes a front wheel support 228 that spans between two front wheels 232. A pivot torsion bracket 236 is positioned mid-way along the front wheel support 228 between the front wheels 232. The pivot torsion bracket 236 has a pivot torsion bracket opening 240 and side walls 244 that define a non-circular interior profile. In the illustrated example, the profile of the pivot torsion bracket opening 240 is hexagonal, and there are six equally dimensioned side walls 244.

A plurality of resilient torsion members 248a, 248b, 248c (collectively 248) each include a main resilient body 250 having a peripheral surface 252 that is hexagonal in profile and corresponding to the interior profile of the pivot torsion bracket 236. The main resilient body 250 is constructed of a resilient material, such as rubber, that deforms somewhat in response to a torsion force. Each main resilient body 250 has a non-cylindrical recess in the form of a non-cylindrical through-hole 256, square in the illustrated example to correspond to the profile of the pivot through-hole 220, affixed to it in a central position. The non-cylindrical through-hole 256 is constructed of any suitable material that is generally non-deformable when subject to mild torsional forces, such as steel. Alternatively, the non-cylindrical through-hole may be simply formed as the inner surfaces of a recess within the resilient torsion members. The non-cylindrical through-hole 256 resists rotation relative to the peripheral surface 252 of the resilient torsion member 248, generating a torsional force urging the non-cylindrical through-hole 256 back to an initial angular orientation relative to the peripheral surface 252.

A compressible spacer 258 is made of a suitable resilient material such as rubber or polyurethane.

A pivot anchor 260 has a pivot post 264 of a profile that prevents rotation of the pivot post 264 relative to the pivot through-hole 220 and the non-cylindrical through-holes 256 of the resilient torsion members 248 when the pivot post 264 is inserted therethrough. In a preferred example, the pivot post 264 has substantially the same profile as the pivot through-hole 220 and the non-cylindrical through-holes 256. A pivot anchor cap 268 tops the pivot post 264.

Figure 8A:
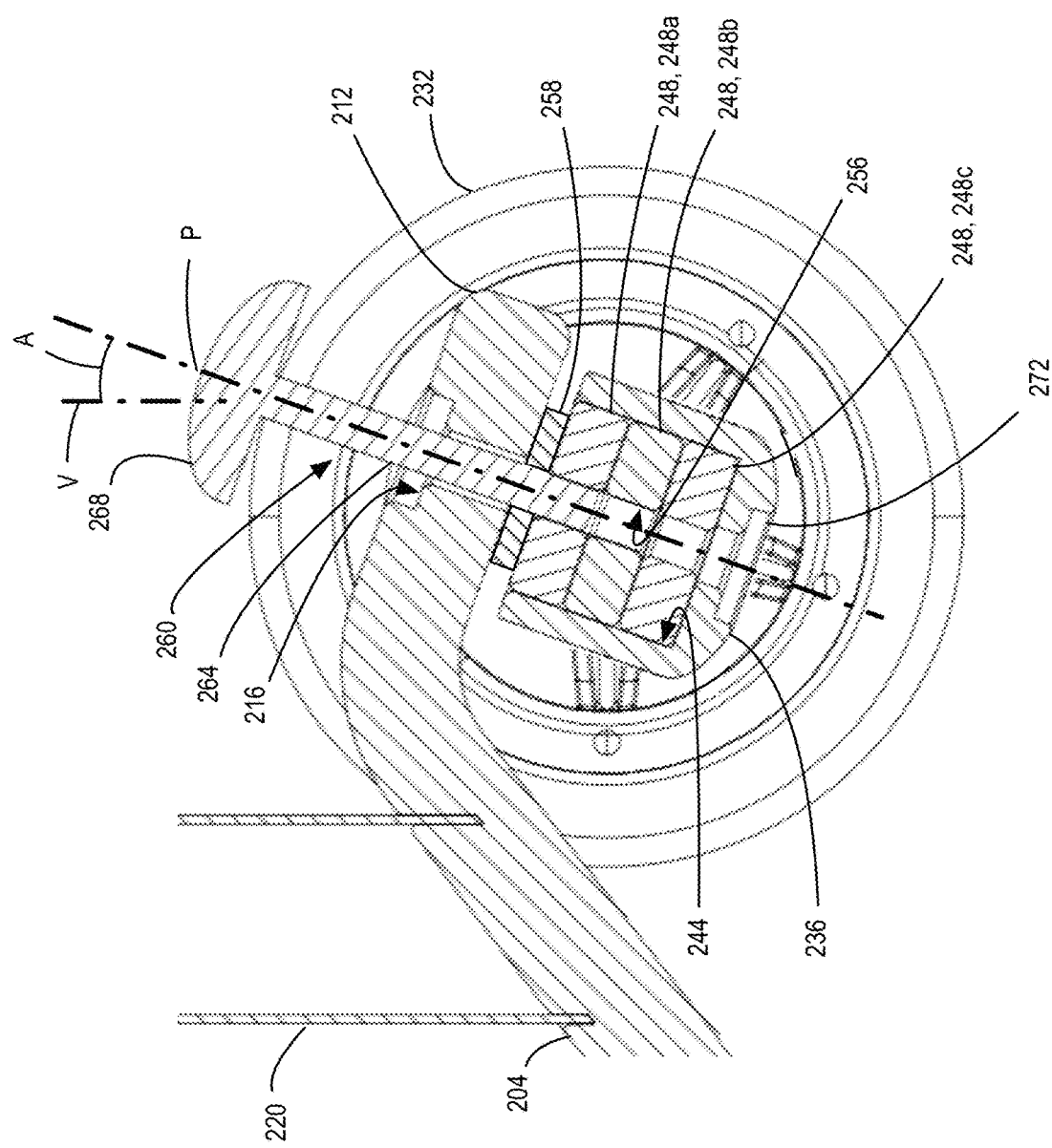
FIG. 8A is a side section view of the front part of the scooter of FIG. 7, taken along line 8-8, showing the insertion of a pivot column through one of the resilient torsion members.
Figure 8B:
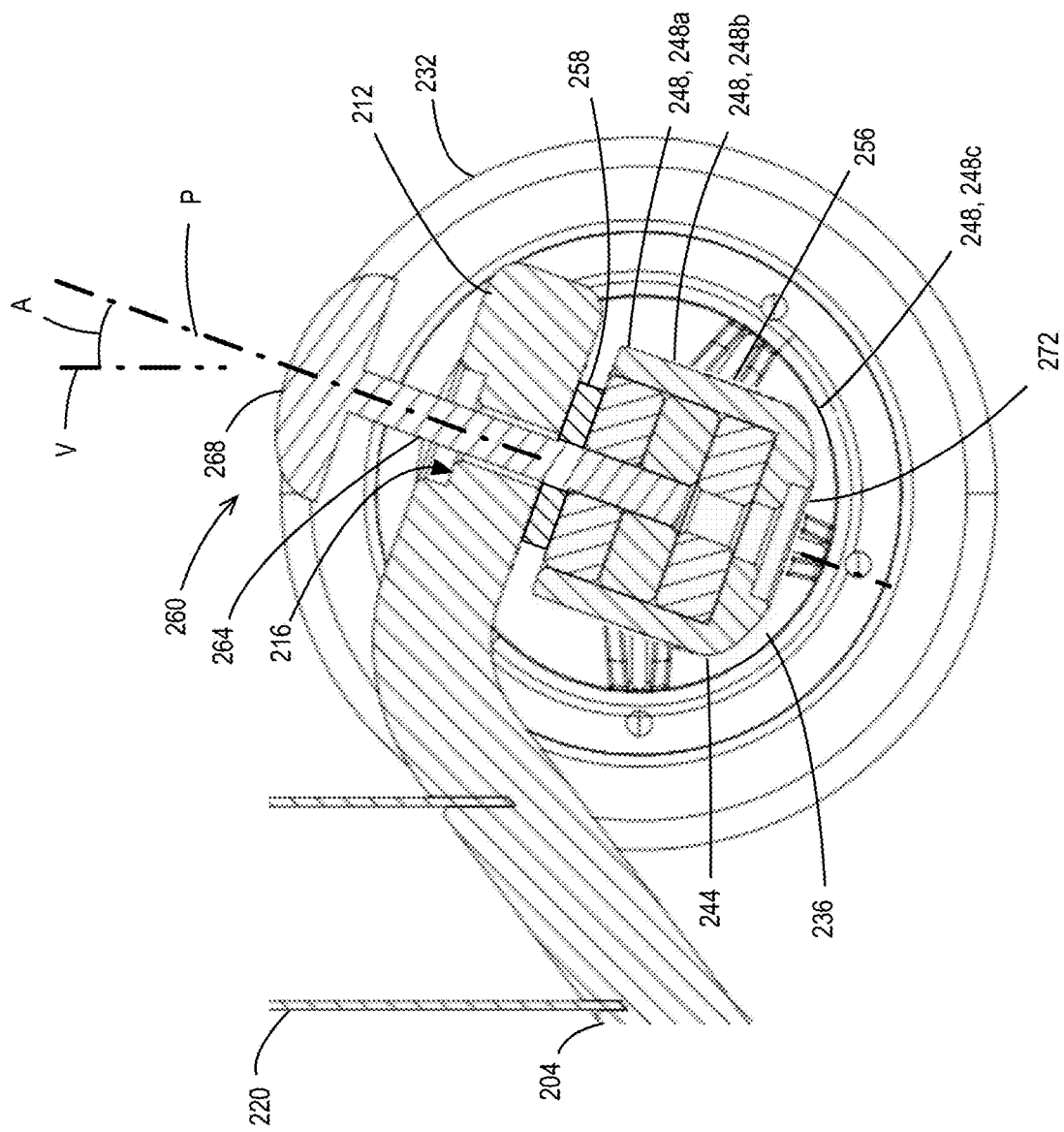
FIG. 8B is a side section view of the front part of the scooter of FIG. 7, taken along line 8-8, showing the insertion of a pivot column through two of the resilient torsion members.
Figure 8C:
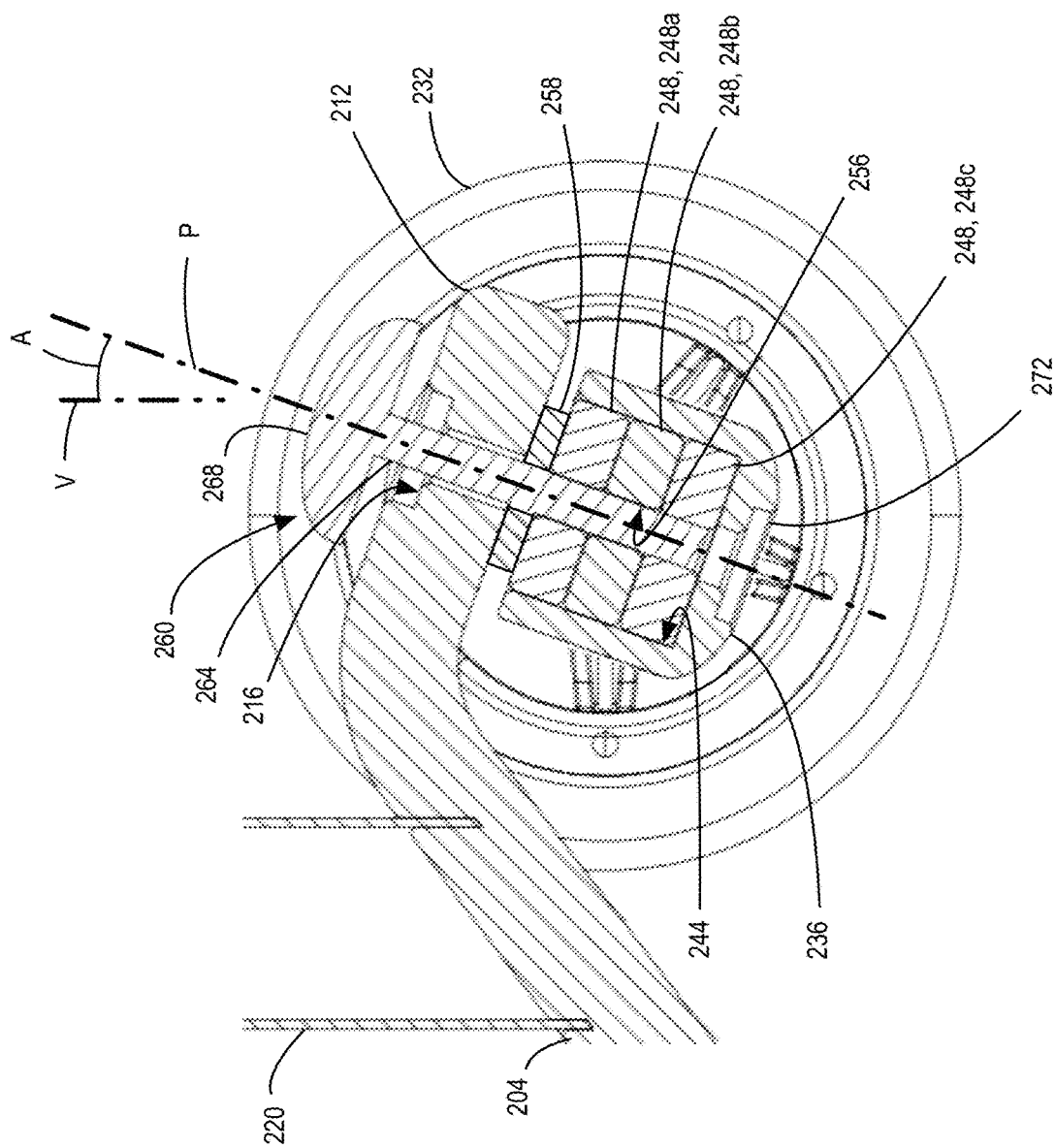
FIG. 8C is a side section view of the front part of the scooter of FIG. 7, taken along line 8-8, showing the insertion of a pivot column through all three of the resilient torsion members.

FIGS. 8A to 8C show the insertion of the pivot anchor 260 through the pivot through-hole 220 and in three different positions after placement of the resilient torsion members 248 into the pivot torsion bracket opening 240 of the pivot torsion bracket 236. In a first position shown in FIG. 8A, the pivot post 264 is inserted through the compressible spacer 258 and friction fit into the non-cylindrical through-holes 256 of the resilient torsion member 248a, but not through the other two resilient torsion members 248b and 248c. As a result, the front wheel assembly 224 is coupled to the foot-deck 204 via the one resilient torsion member 248a. In a second position shown in FIG. 8B, the pivot post 264 is inserted through the compressible spacer 258 and friction fit into the non-cylindrical through-holes 256 of the resilient torsion members 248a and 248b, but not through the other resilient torsion member 248c. As a result, the front wheel assembly 224 is coupled to the foot-deck 204 via two of the resilient torsion members 248a, 248b. In a third position shown in FIG. 8C, the pivot post 264 is inserted through the compressible spacer 258 and friction fit into the non-cylindrical through-holes 256 of all three resilient torsion members 248. As a result, the front wheel assembly 224 is coupled to the foot-deck 204 via all three resilient torsion members 248. The resilient torsion members 248 fit snugly within the pivot torsion bracket opening 240, preventing rotation of the resilient torsion members 248 within the pivot torsion bracket opening 240. The pivot post 264 is friction fit against the non-cylindrical through-hole 256, preventing rotation of the pivot post 264 within the non-cylindrical through-hole 256 of the resilient torsion member 248a.

The declining coupling head 212 is angled so that the pivot through-hole 220 has a front wheel assembly pivot axis P that is at an acute angle A to a vertical axis V when the scooter 200 is upright.

As a rider shifts their center-of-gravity while on the foot-deck 204 of the scooter 200, a turning force is applied to the front wheel assembly 224 to rotate it relative to the foot-deck 224 due primarily to the orientation of the front wheel assembly pivot axis P relative to the vertical axis V. As the pivot post 264 is prevented from rotating relative to the non-cylindrical through-holes 256 into which it has been friction fit, and as the peripheral surfaces 252 of the resilient torsion members 248 are prevented from rotating within the pivot torsion bracket opening 240 of the pivot torsion bracket 236, a torsional force is applied to the resilient torsion members 248. The torsional force resists rotation of the non-cylindrical through-holes 256 relative to the peripheral surfaces 252 of the resilient torsion members 248 through which the pivot post 264 has been friction fit. That is, in the first position illustrated in FIG. 8A, the resilient torsion member 248a alone applies a centering force biasing the front wheel assembly 224 to a neutral steering position. In the second position illustrated in FIG. 8B, the resilient torsion members 248a and 248b apply a centering force biasing the front wheel assembly 224 to a neutral steering position. In the third position illustrated in FIG. 8C, the resilient torsion members 248a, 248b, and 248c apply a centering force biasing the front wheel assembly 224 to a neutral steering position. Where each resilient torsion member 248 is constructed to resist torsion equally, one unit of centering force is applied to the front wheel assembly 224 when the pivot anchor 260 is in the first position, two units of centering force in the second position, and three units of centering force in the third position.

As will be understood, the centering force provided by the resilient torsion members 248 can be adjusted by selecting resilient torsion members with varying resistance to torsional forces. Additionally, the centering force provided by the resilient torsion members 248 can be varied by adding or removing individual resilient torsion members 248 to or from the pivot torsion bracket 236. The resilient torsion members can be constructed to enable graduated levels of centering force to be provided. For example, in a set of three resilient torsion members, a first can provide one unit of centering force, a second can provide two units of centering force, and a third can provide three units of centering force. Different combinations of the three resilient torsion members can allow one, two, three, four, five, or six units of centering force to be provided.

In another configuration, a single resilient torsion member can be used in place of the three resilient torsion members 256 of the above embodiment, the single resilient torsion member having a similar exterior profile as that of the three resilient torsion members 256. In effect, when the three resilient torsion members 256 have the same resistance to torquing (for example, as they may be made from the same material) and the same thickness, it can be said that the three resilient torsion members 256 act as a single resilient torsion member. In addition, the single resilient torsion member can have a non-circular recess in the form of a hole that does not pass entirely through the single resilient torsion member. The torsional centering force provided by the single resilient torsion member can be adjustable by inserting or withdrawing the pivot anchor 268, thus increasing or decreasing the portion/length of the single resilient torsion member that couples the front wheel assembly 224 to the foot-deck 204 and, thus, the resistance to torsion.

Other types of resilient torsion members that exert a force resisting torsioning can be employed. For example, a resilient torsion member constructed of a resilient material, such as a polymer, that is fixed relative to a foot-deck at a first location along a longitudinal length thereof can be coupled to a front wheel assembly at a second location along the length thereof, and can rely on properties of the structure that allow, but resist, deformation via torsional forces between the foot-deck and the front wheel assembly to urge the front wheel assembly to a neutral steering position. Increasing the length of the resilient torsion member between the two locations (that is, coupling the front wheel assembly to the foot-deck) can enable adjustment of the force-displacement relationship of the centering structure.

Figure 9:
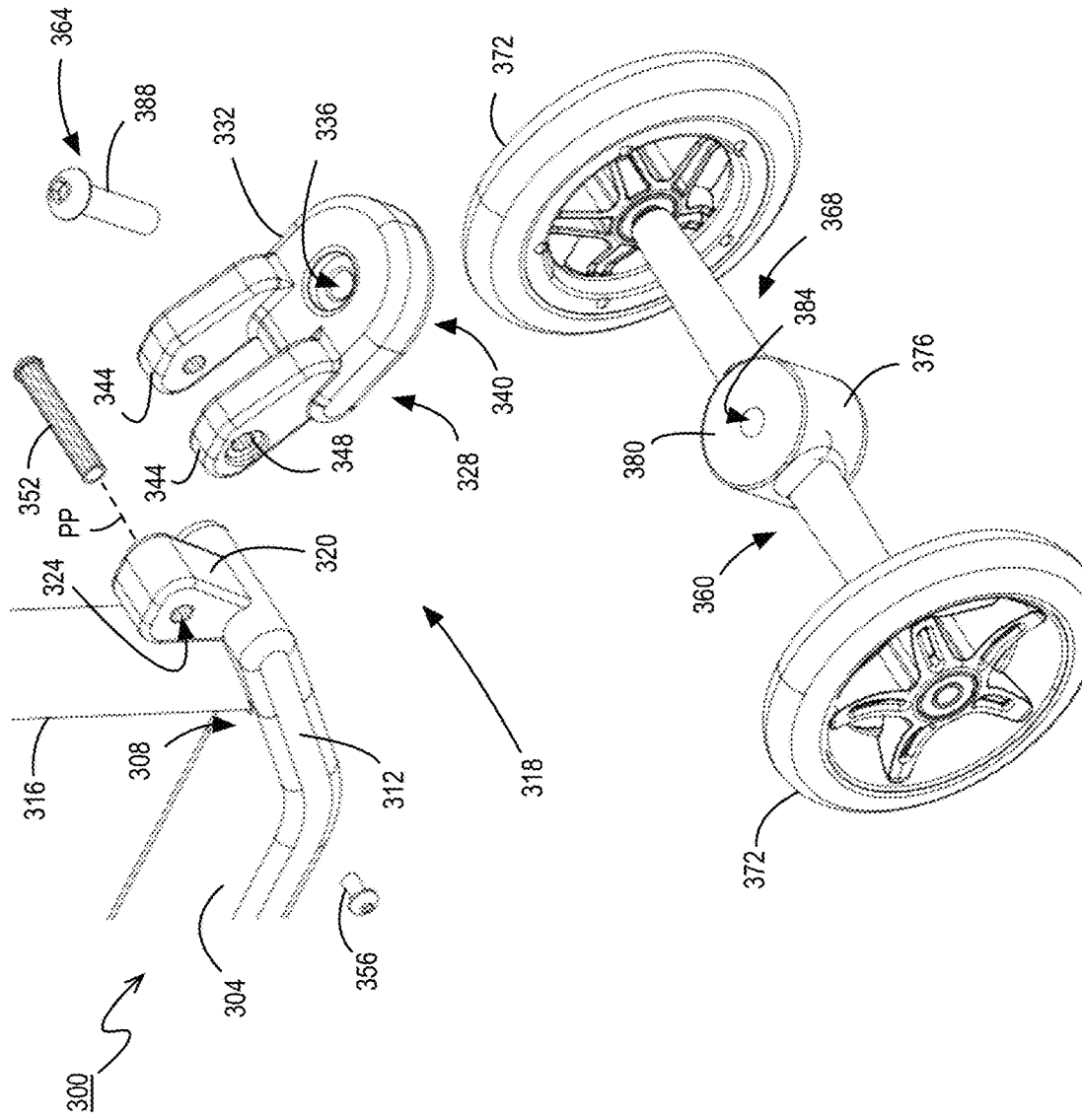
FIG. 9 is an exploded isometric view of a front part of a scooter having a pivot adjustment structure according to yet another embodiment.
Figure 10:
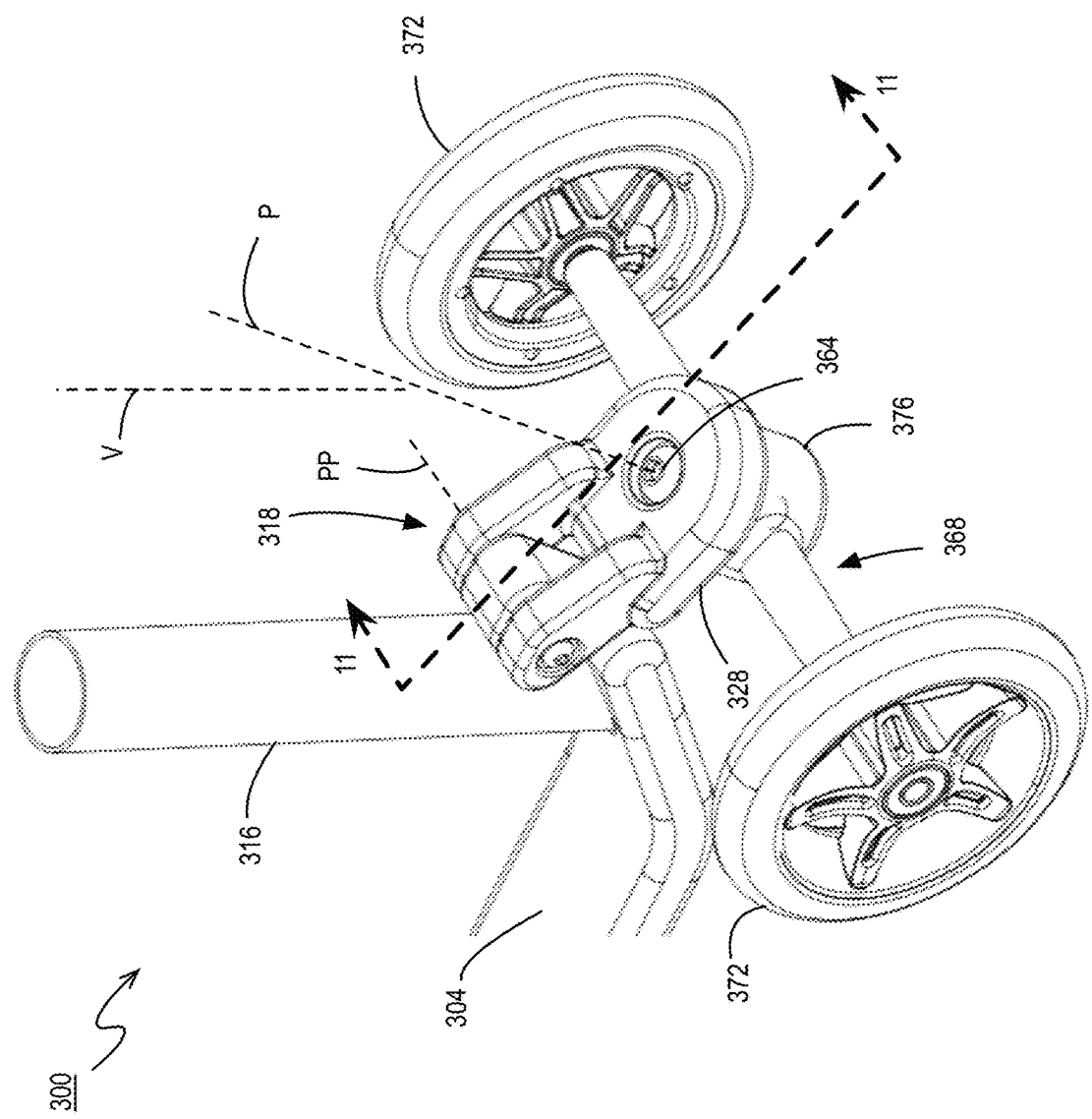
FIG. 10 is an assembled isometric view of the front part of the scooter of FIG. 9.

FIGS. 9 and 10 illustrate a scooter 300 in accordance with another embodiment. The scooter 300 includes a foot-deck 304 that has a rear end (not shown) and a front end 308. An inclined portion 312 extends from the front end of the foot-deck 304. A handlebar assembly 316 extends vertically from the inclined portion 312 when the scooter 300 is upright.

A steering characteristic adjustment structure in the form of a pitch adjustment structure 318 is shown, and includes a pivot base 320 that extends from the inclined portion 312. The pivot base 320 has a generally cylindrical hole 324 with a set of features on an inside surface thereof in the form of laterally extending teeth.

A pivot coupler 328 has a main body 332 with a through-hole 336 extending therethrough. A bottom surface 340 of the main body 332 is generally planar. Two arms 344 extend rearwardly from the main body 332 and have coaxial generally cylindrical holes 348 with laterally extending teeth. A toothed locking bolt 352 having the same profile of laterally extending teeth as the holes 324 and 348 can be inserted through the holes 324 and 348 and secured therein via a nut 356 when the holes 324 and 348 are aligned to releasably fix the pivot coupler 328 in a selected pivotal orientation relative to the foot-deck 304. A pitch pivot axis PP is coaxial with the generally cylindrical holes 324, 348 when the scooter 300 is assembled.

The pivot coupler 328 is in turn coupled to a front wheel assembly 360 via a pivot anchor 364. The front wheel assembly 360 includes a front wheel support 368 that spans between a pair of front wheels 372. A pivot bracket 376 is positioned along the front wheel support 368 mid-way between the front wheels 372 and is a cylindrical housing that houses a compressible bushing 380 that has a pivot through-hole 384 passing through it coaxially. The compressible bushing 380 is made of a suitably compressible and resilient material such as vulcanized rubber.

The pivot anchor 364 has a pivot post 388 that extends through the compressible bushing 380 and is secured to a corresponding pivot anchor nut (not shown). The compressible bushing 380 allows free pivoting of the front wheel assembly 360 relative to the pivot post 388 about a front wheel assembly pivot axis P that is coaxial to the pivot post 388 when the front wheel assembly 360 is centred in a neutral steering position, as shown in FIG. 10. When the foot-deck 304 is rolled to one side, the pivot coupler 328 is also rolled. The angular displacement from a vertical axis V of the front wheel assembly pivot axis P causes the front wheel assembly 360 to pivot about the front wheel assembly pivot axis P to turn the scooter 300. The pivot post 388 of the pivot anchor 364 is tilted within the compressible bushing 380 to apply a centering force to the front wheel assembly 360.

Figure 11A:
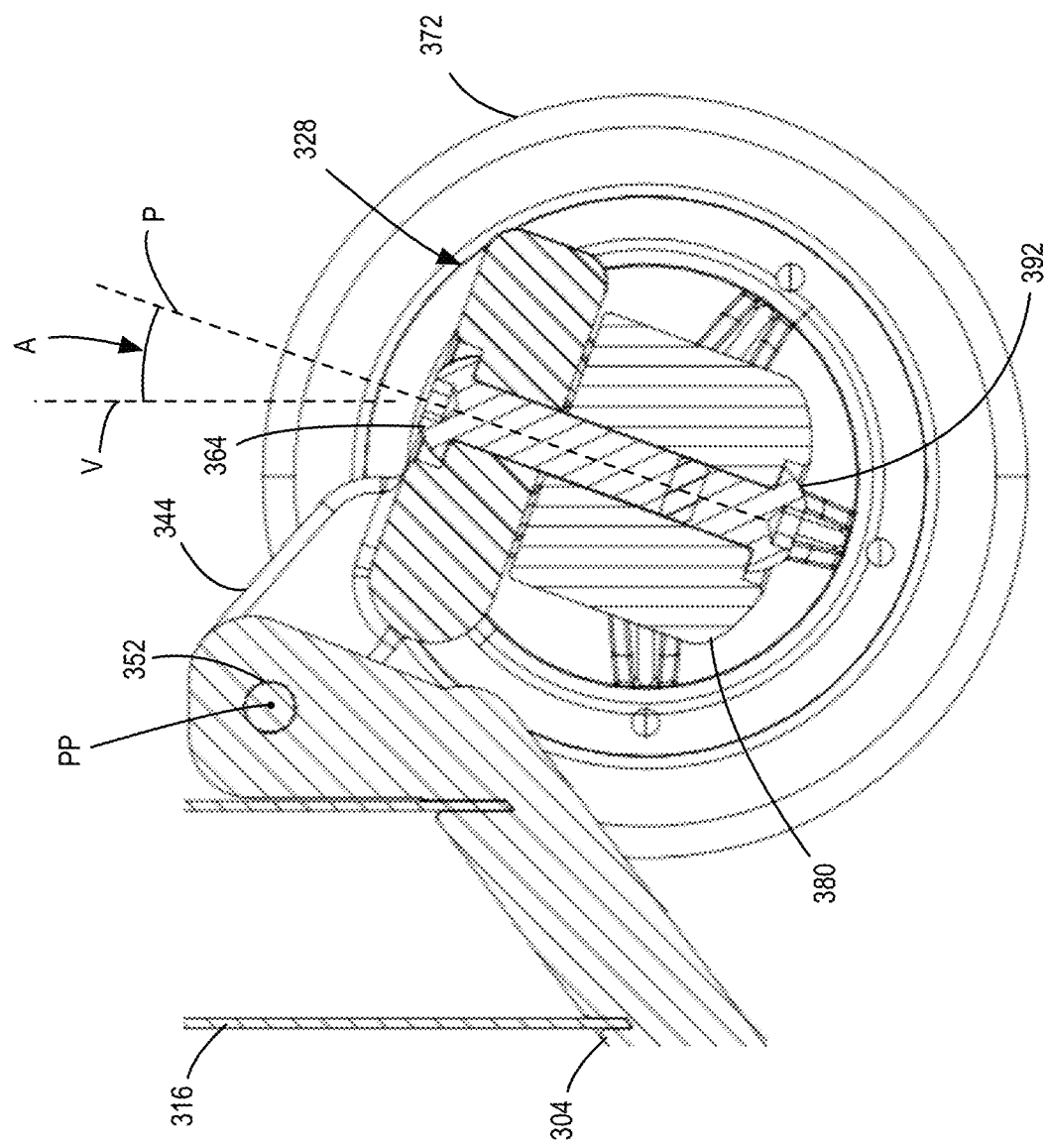
FIGS. 11A and 11B are side section views of the scooter of FIGS. 9 and 10 with the pivot adjustment structure in three different positions, taken along line 11-11 in FIG. 10.
Figure 11B:
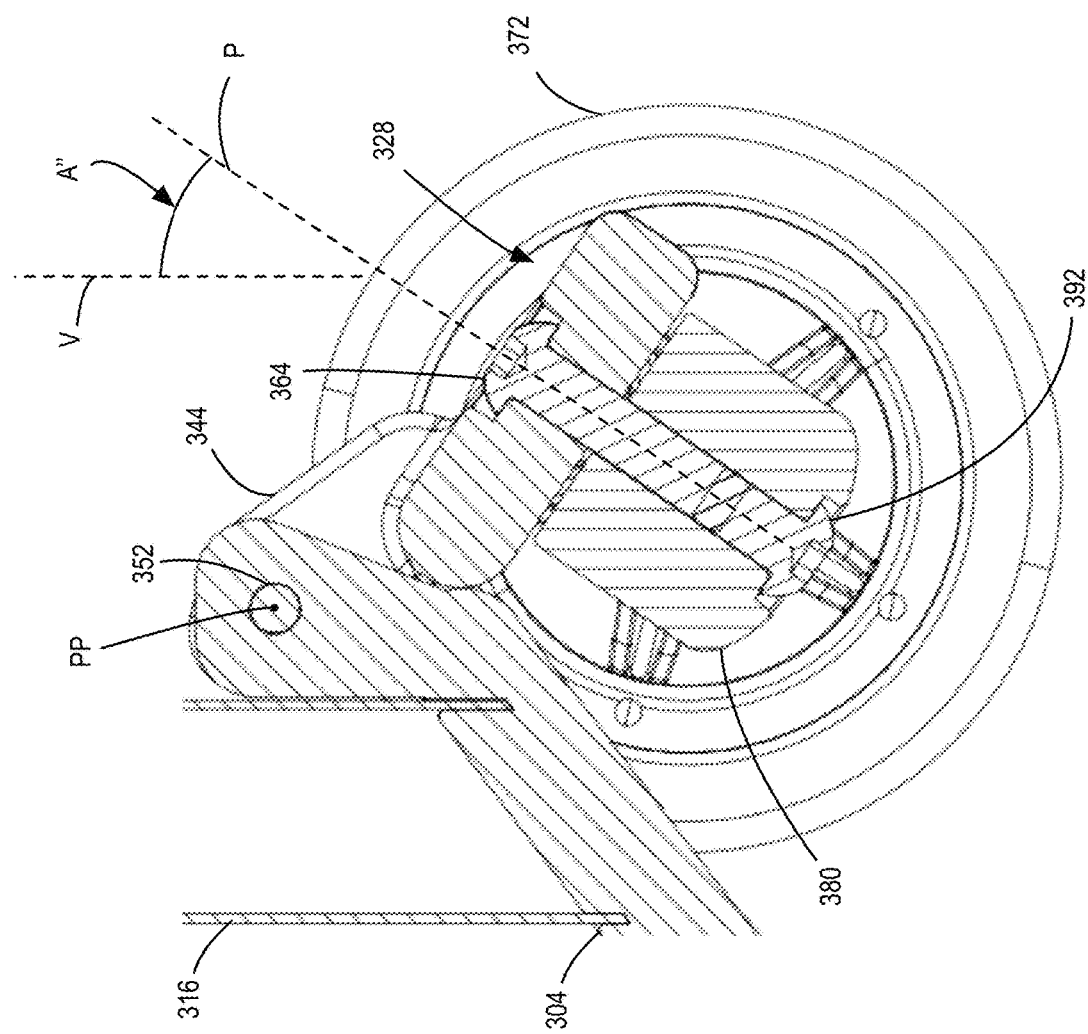

FIGS. 11A and 11B show the front portion of the scooter 300 with the pivot coupler 328 of the pitch adjustment structure 318 in three different positions. In a first position shown in FIG. 11A, the front wheel assembly pivot axis P is angled at an acute angle A of about 19 degrees when the scooter 300 is upright. In a second position shown in FIG. 11B, the front wheel assembly pivot axis P is at an acute angle A' of about 34 degrees when the scooter 300 is upright. In this position, the front wheel assembly 360 is more responsive to turning relative to the position of the pivot coupler 328 shown in FIG. 11A.

Figure 12:
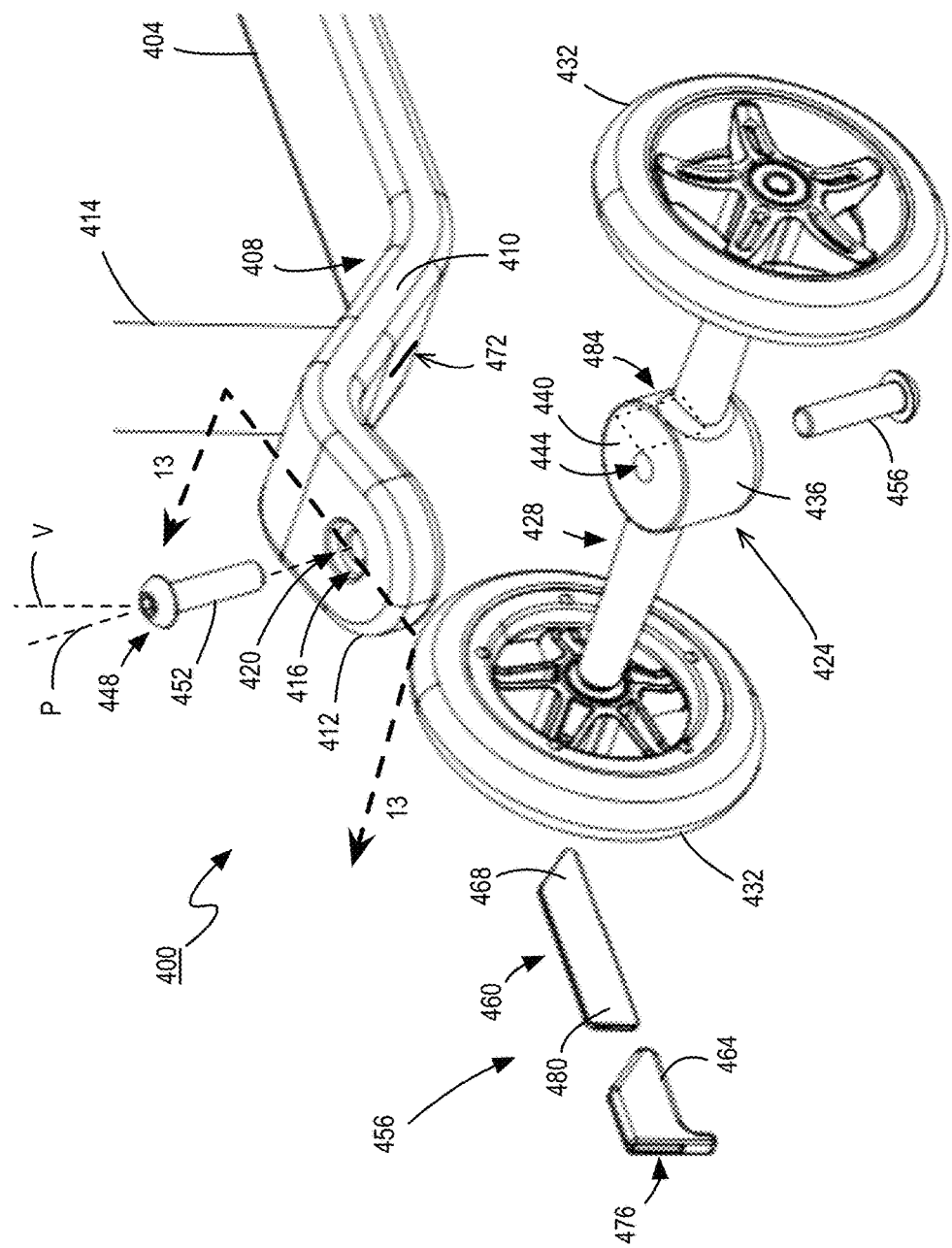
FIG. 12 is an exploded isometric view of a front part of a scooter having an adjustable pivot-limiting structure according to a further embodiment.

FIG. 12 shows a foot-deck-based vehicle in accordance with another embodiment. The foot-deck-based-vehicle is a scooter 400 having a foot-deck 404 having a front end 408 and a back end (not shown). Extending from the front end 408 is an inclined section 410 leading to a declining coupling head 412. A handlebar assembly 414 extends upwardly from the inclined portion 410. The declining coupling head 412 has a cylindrical recess 416 on a top surface thereof, with a pivot through-hole 420 extending therethrough. The pivot through-hole 420 defines a front wheel assembly pivot axis P.

A front wheel assembly 424 includes a front wheel support 428 that spans between two front wheels 432. A pivot bracket 436 is positioned along the front wheel support 428 mid-way between the front wheels 432 and is a cylindrical housing that houses a compressible bushing 440 that has a pivot through-hole 444 passing through it coaxially. The compressible bushing 444 is made of a suitable material such as vulcanized rubber.

A pivot anchor 448 having a pivot post 452 is inserted through the pivot through-hole 420 and the compressible bushing 440, and is secured to a corresponding pivot anchor nut 456. The compressible bushing 440 allows free pivoting of the front wheel assembly 424 relative to the pivot post 452 about the front wheel assembly pivot axis P that is coaxial to the pivot post 452 when the front wheel assembly 424 is centred in a neutral steering position. When the foot-deck 404 is rolled to one side, the angular displacement from a vertical axis V of the front wheel assembly pivot axis P causes the front wheel assembly 424 to pivot about the front wheel assembly pivot axis P to turn the scooter 400. The pivot post 452 of the pivot anchor 448 is tilted within the compressible bushing 440 to apply a centering force to the front wheel assembly 424.

The scooter 400 has a steering characteristic adjustment structure in the form of a centering force adjustment structure 456. The centering force adjustment structure 456 includes a leaf spring 460 over which is fitted a stiffening sleeve 464. A first end 468 of the leaf spring is affixed within a niche 468 of the inclined portion 410. The stiffening sleeve 464 is friction fitted over the leaf spring 460 via a leaf spring channel 476 passing therethrough. A second end 480 of the leaf spring 460 is inserted into a leaf spring slot 484 in a rear surface of the pivot bracket 436.

When the foot-deck 404 is rolled to one side, the angular displacement from a vertical axis V of the front wheel assembly pivot axis P causes the front wheel assembly 424 to pivot about the front wheel assembly pivot axis P to turn the scooter 400. The pivot post 452 of the pivot anchor 448 is tilted within the compressible bushing 440 to apply a centering force to the front wheel assembly 424. In addition, as the front wheel assembly 424 pivots, the leaf spring slot 484 in the pivot bracket 436 is shifted out of plane of the leaf spring 460, causing the leaf spring 460 to bend and, as a result, exert a centering force on the front wheel assembly 424. The stiffening sleeve 464 can be positioned to expose more or less of the leaf spring 460, thereby reducing or augmenting the centering force provided by the leaf spring 460.

Figure 13A:
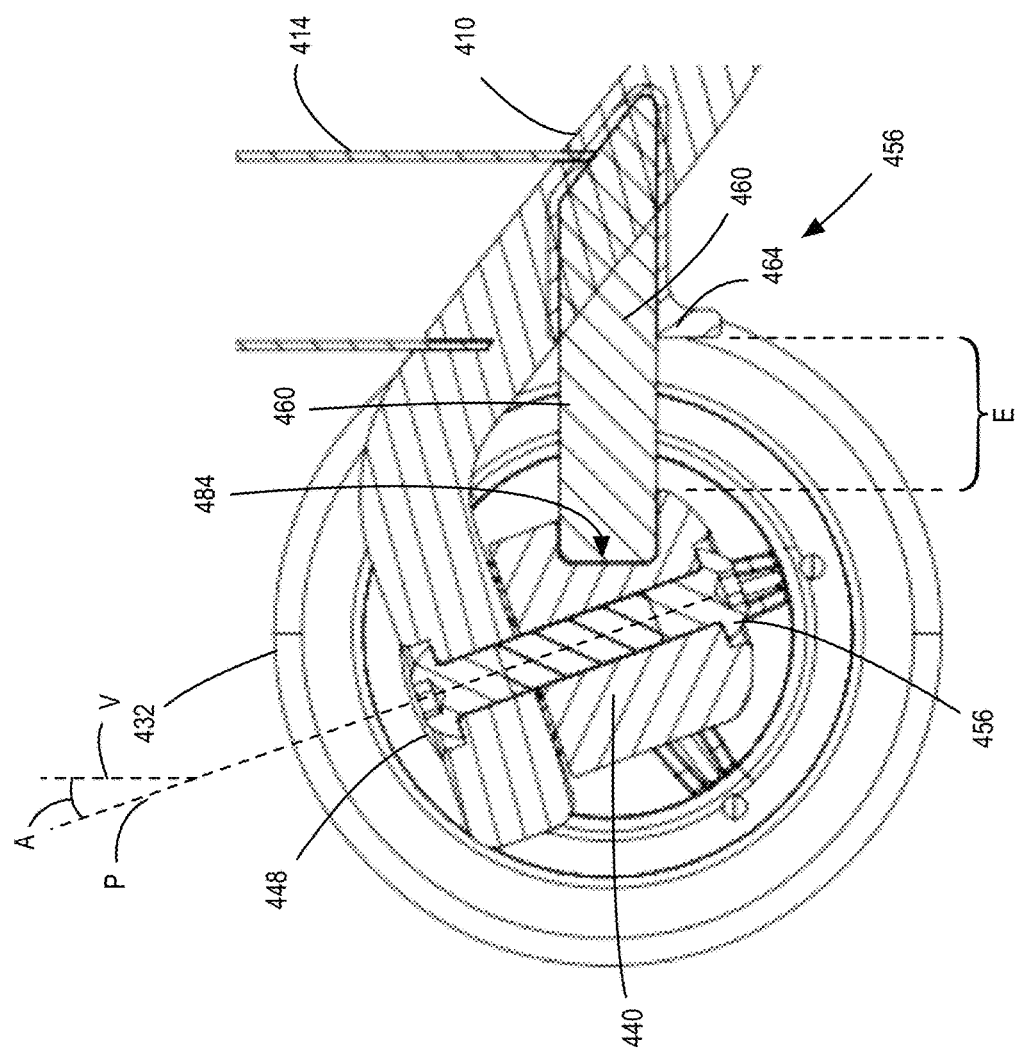
FIGS. 13A to 13C are section views of the scooter of FIG. 12 with the adjustable pivot-limiting structure in three positions, taken along line 13-13.
Figure 13B:
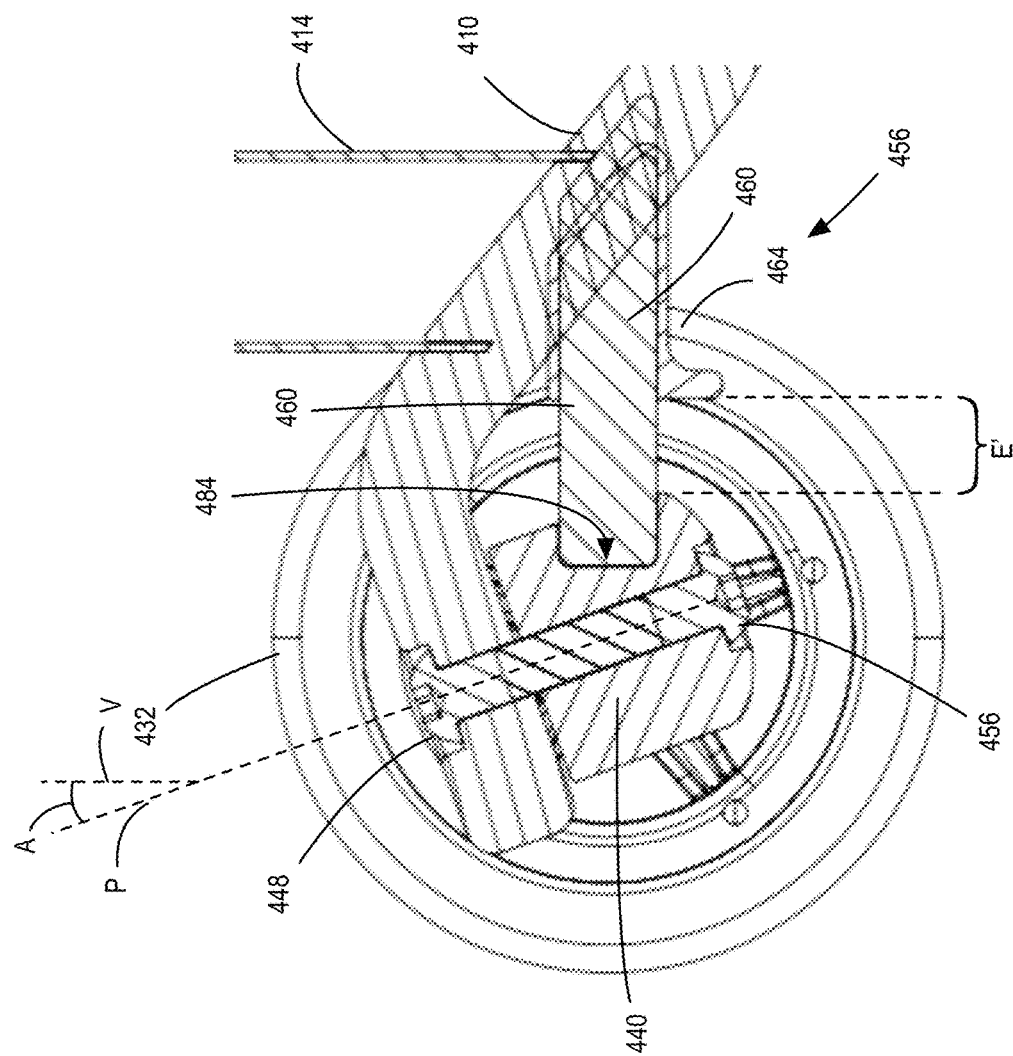
Figure 13C:
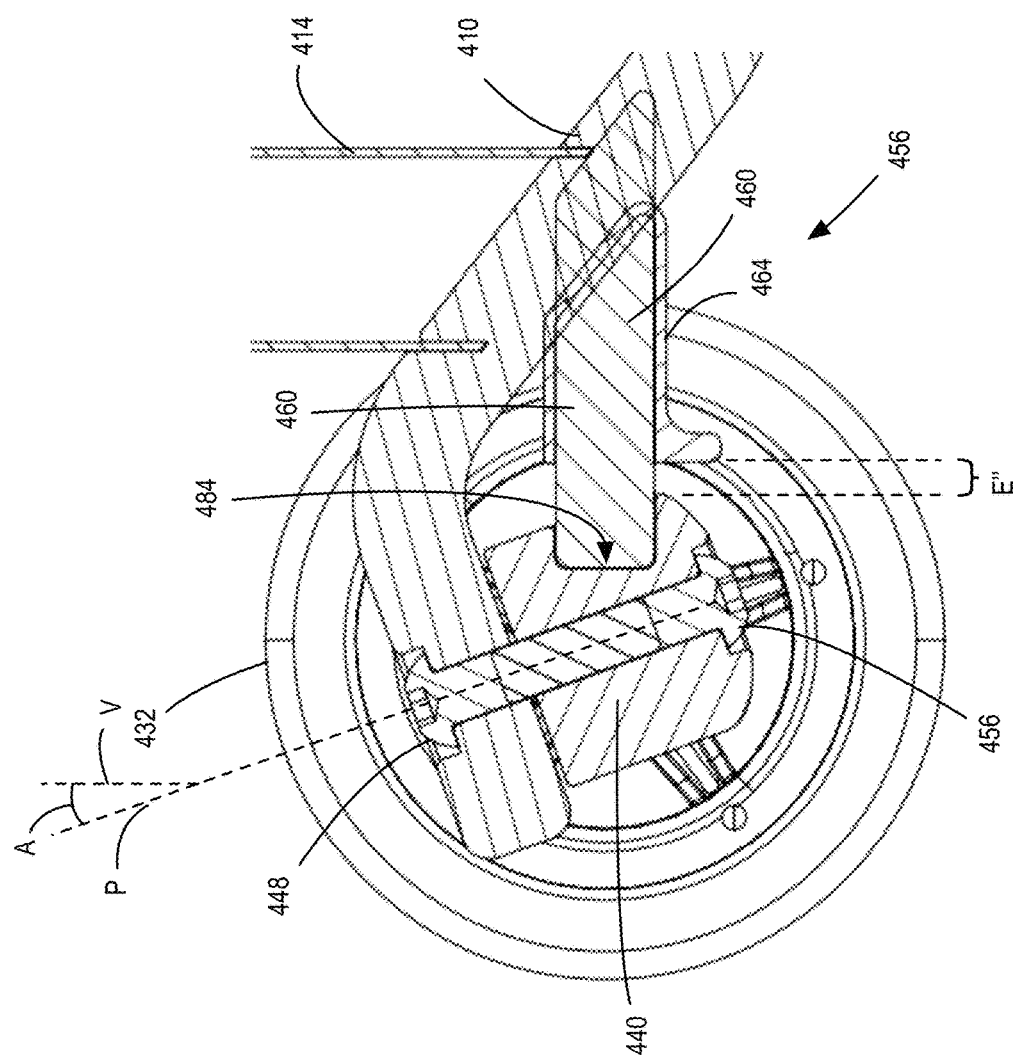

FIGS. 13A to 13C show placement of the stiffening sleeve 464 in three different positions along the leaf spring 460. In a first position shown in FIG. 13A, the stiffening sleeve 464 is slid back fully along the leaf spring 460 to expose a length E of the leaf spring 460. In this first position, with the stiffening sleeve 464 slid as far back as permitted, the exposed length E is at its maximum, minimizing the centering force exerted by the leaf spring 460 on the front wheel assembly 424. In a second position shown in FIG. 13B, the stiffening sleeve 464 is slid back along the leaf spring 460 an intermediate distance to expose the length E' of the leaf spring 460. In this second position, with the stiffening sleeve 464 slid less far back than in the first position, the exposed length E' is shorter than E. The shortened length of the exposed portion of the spring leaf 460 is more resistant to bending and exerts a larger centering force when bent laterally an equal amount. In a third position shown in FIG. 13C, the stiffening sleeve 464 is slid forward fully along the leaf spring 460 to expose a minimal length E" of the leaf spring 460. In this third position, with the stiffening sleeve 464 slid forward more than in the other two positions, the exposed length E" is shorter than E and E'. The still further shortened length of the exposed portion of the spring leaf 460 is still more resistant to bending and exerts a still yet larger centering force when bent laterally an equal amount in comparison to the positions shown in FIGS. 13A and 13B.

Figure 14:
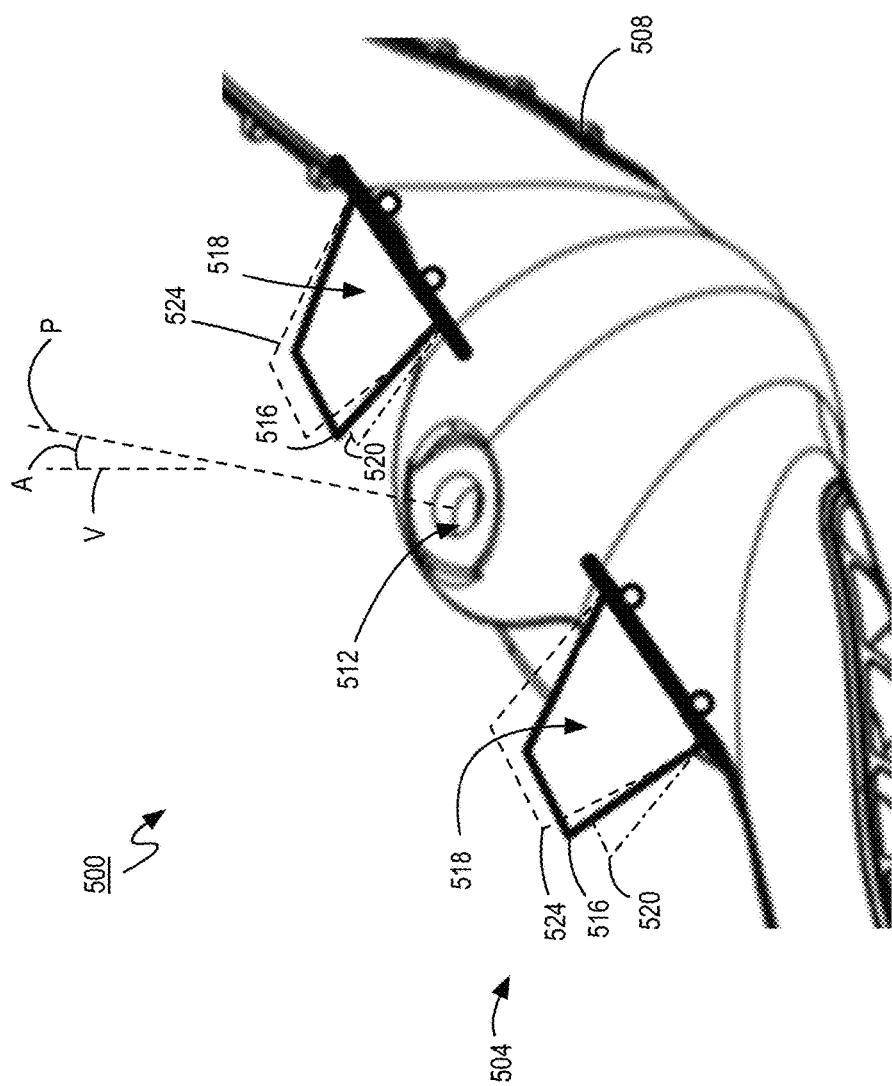
FIG. 14 is a top isometric view of a portion of a front hanger of a scooter having a pair of roll-limiting members in accordance with a further embodiment.

FIG. 14 shows a portion of another foot-deck-based vehicle in accordance with still yet another embodiment. The foot-deck-based vehicle in this embodiment is a scooter 500 having a foot-deck (not shown) that is pivotally coupled to a front wheel assembly 504. The front wheel assembly 504 includes a front wheel support 508 that spans between a pair of front wheels (not shown). The front wheel support 508 has a pivot through-hole 512 through which a pivot anchor is inserted to couple the front wheel assembly 504 to the foot-deck. A front wheel assembly pivot axis P defined by a corresponding pivot through-hole of the foot-deck is at an acute angle A to a vertical axis V when the scooter 500 is upright.

The scooter 500 is a lean-to-steer type vehicle, wherein a rider shifting their center-of-gravity laterally from a central axis of the foot-deck results in rolling of the foot-deck in the same lateral direction and, as a result, pivoting of the front wheel assembly 504 to turn the scooter 500 in the general lateral direction of the roll of the foot-deck. The further the rider's center-of-gravity is shifted laterally, the more the foot-deck rolls to one side, and, as a result, the more the front wheel assembly 504 pivots to turn the scooter 500.

The scooter 500 includes a steering characteristic adjustment structure for adjusting a steering characteristic of the scooter 500. The steering characteristic adjustment structure in this embodiment is a roll-limiting structure in the form of a pair of foot-deck roll limiter tabs 516 that are positionable at a number of positions. The foot-deck roll limiter tabs 516 extend under a front end of the foot-deck to limit how much the foot-deck can roll to either side. As the foot-deck is rolled to either side, an underside of the foot-deck or a feature thereof abuts a top surface 518 of the foot-deck roll limiter tab 516 on the respective side to which the foot-deck is rolling, thus limiting the ability of the foot-deck to continue rolling further to that side. As the foot-deck is restricted from rolling past the foot-deck roll limiter tabs 516, the range of pivoting of the front wheel assembly 504 is thus limited. By adjusting the position of the foot-deck roll limiter tabs 516 to a lower position 520, the foot-deck may be rolled further than when the foot-deck roll limiter tabs 516 are in their intermediate illustrated position, thus enabling further effective pivoting of the front wheel assembly 504 and, accordingly, an increase in the maximum turn rate of the scooter 500. The maximum turn rate is generally defined as the maximum rate of turning of the vehicle as it travels at a constant speed. Further, by adjusting the position of the foot-deck roll limiter tabs 516 to a higher position 524, the foot-deck may be rolled less than when the foot-deck roll limiter tabs 516 are in their intermediate illustrated position, thus effectively further restricting pivoting of the front wheel assembly 504 and, accordingly, a decrease in the maximum turn rate of the scooter 500 while it is being used. The roll-limiting structure thus effectively is a pivot range control structure that controls a pivot range of the front wheel assembly about the front wheel assembly pivot axis.

In other embodiments, features extending from the foot-deck can abut against the front wheel assembly to limit rolling of the foot-deck, thereby limiting the effective turning range of the foot-deck-based vehicle.

While, in the above-described embodiment, foot-deck roll limiter tabs are employed to adjustably limit the roll range and, thus, the pivot range of the front wheel assembly (and the maximum turn rate) of the foot-deck-based vehicle, other structures for limiting the maximum roll of the foot-deck for such lean-to-steer vehicles can be employed. For example, height-adjustable caster wheels deployed on each lateral side of the underside of the foot-deck can limit rolling of the foot-deck without interfering with the continued travel of the foot-deck-based vehicle across a travel surface. In another embodiment, the length of the front wheel support separating the front wheels can be made adjustable.

Further, other approaches for controlling the pivot range and, thus, the maximum turning rate for other types of foot-deck-based vehicles can be used. For example, in one embodiment, where a vehicle is steered via a handlebar assembly, pivot-limiting structures of the handlebar assembly can limit turning of the handlebar assembly and, thus, the front wheel assembly.

While various foot-deck-based vehicles have been described having a front wheel assembly having two front wheels, in other embodiments, the front wheel assembly can have one front wheel. In still further embodiments, the front wheel assembly can have three or more front wheels.

While the centering structures described above directly apply a centering force to the front wheel assembly, other centering structures can directly indirectly or indirectly apply a centering force on the front wheel assembly. For example, where a handlebar assembly is used to steer a foot-deck-based vehicle, an adjustable centering structure can act directly on the handlebar assembly, applying an adjustable centering force on the handlebar assembly when it is rotated away from a neutral steering position (i.e., center).

In other embodiments, the adjustable centering structure can comprise one or more resilient tension members that can be used to apply a centering force when the foot-deck-based vehicle is steered away from a neutral steering position.

Figure 15:
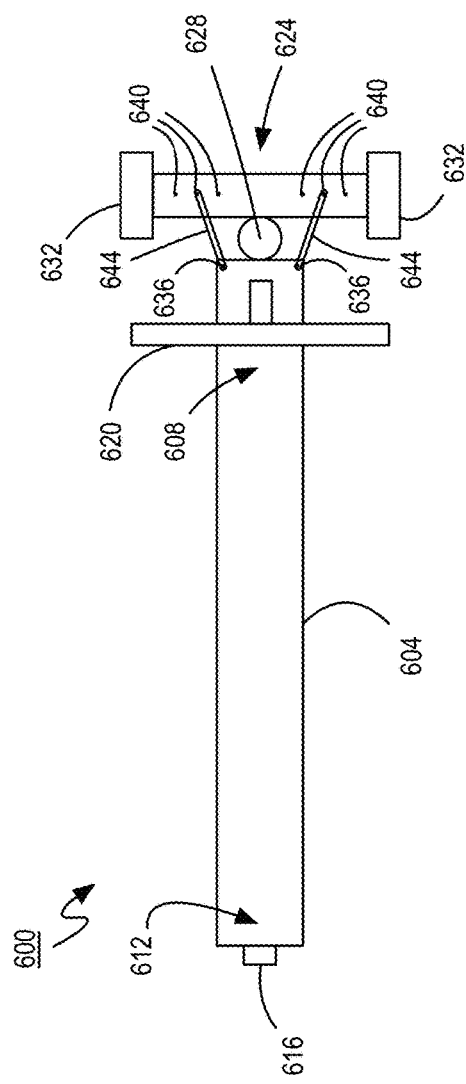
FIG. 15 is a top view of a scooter having a centering structure exerting an adjustable centering force, and including a pair of elastic bands in accordance with yet another embodiment.

FIG. 15 shows a scooter 600 having an adjustable steering characteristic in accordance with yet another embodiment. The scooter 600 has a foot-deck 604 having a front end 608 and a rear end 612. A rear wheel 616 is coupled to the foot-deck 604 proximal to the rear end 612. A handlebar assembly 620 extends generally vertically from the foot-deck 604 proximal to the front end 608. A front wheel assembly 624 is pivotally coupled to the foot-deck 604 via a pivot joint 628. The pivot joint 628 enables the front wheel assembly 624 to pivot relative to the foot-deck 604 about a front wheel assembly pivot axis that forms an acute angle relative to a vertical axis when the scooter 600 is upright so that the front wheel assembly 624 pivots when a rider shifts their center-of-gravity laterally on the foot-deck 604. The front wheel assembly 624 includes a pair of front wheels 632 rotatably coupled to its lateral ends. A steering characteristic adjustment structure in the form of a centering structure includes a pair of hooks 636 extending from a top surface of the foot-deck 604 proximal to the front end 608 thereof, and a centering force adjustment structure in the form of a set of adjustment pins 640 spaced apart laterally atop of the front wheel assembly 624. Pairs of the adjustment pins 640 are equally distant from a central point along a lateral axis of the front wheel assembly 624. Each of a pair of resilient tension members in the form of elastic cords 644 is secured around a separate one of the hooks 636 and one of the adjustment pins 640 of the front wheel assembly 624. In particular, the adjustment pins 640 around which the elastic cords 644 are secured are equidistant from the central point along the lateral axis of the front wheel assembly 624. As a rider shifts their center-of-gravity to a lateral side of the foot-deck 604 and the front wheel assembly 624 pivots, thereby turning the scooter 600, the elastic cord 644 on the opposite side of the scooter 600 in which the scooter 600 is turning is extended further. As the elastic cord 644 is extended further, it exerts a greater tension force urging the front wheel assembly 624 back to a neutral (central) steering position, as is shown in FIG. 15. In the neutral steering position, the elastic cords 644 are pre-tensioned and balanced, so that there is a generally zero net force pulling the front wheel assembly 624 to pivot either clockwise or counter-clockwise. The resilience of the resilient tension members enables them to generally maintain their tension characteristics during normal use over the expected lifetime of the scooter 600.

When it is desired to adjust the centering force of the scooter's steering, the elastic cords 644 can be unhooked from the adjustment pins 640 to which they are connected, and placed over a different pair of corresponding adjustment pins 640. In the illustrated example, the elastic cords 644 can be placed on adjustment pins 640 that are closer to or further from the center point along the lateral axis of the front wheel assembly 624. In this way, the centering force provided to the steering of the scooter 600 can be reduced or increased by differently pre-tensioning the elastic cords 644.

Figure 16:
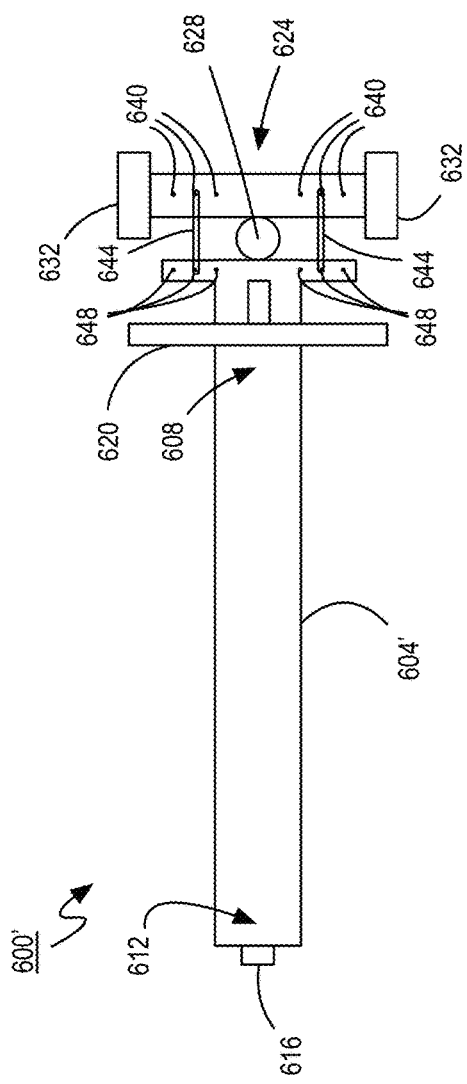
FIG. 16 is a top view of a scooter having a centering structure exerting an adjustable centering force, and including a pair of elastic bands that have additional adjustability relative to the embodiment shown in FIG. 15.

FIG. 16 shows a modified scooter 600' that extends further laterally near its front end 608 and corresponding adjustment pins 648 can be afforded to a foot-deck 604'. The elastic cords 644 are hooked around corresponding adjustment pins on the foot-deck 604' and the front wheel assembly 624 and equally spaced from a central point along the foot-deck 604' and the front wheel assembly 624. When it is desired to change the centering force of the scooter 600', the elastic bands 644 can be shifted to different adjustment pins 648, 640 on both the foot-deck 604' and the front wheel assembly 624 without changing the elongated length of the elastic bands 644 when atop of the new adjustment pins 648, 640. If the elastic bands 644 are shifted to adjustment pins 648, 640 that are closer to the central axis of the foot-deck 604', pivoting of the front wheel assembly 624 further expands the elastic cords 644 by a lesser distance for each unit of angular displacement of the front wheel assembly 624, thereby decreasing the effective centering force on the front wheel assembly 624 by decreasing the length of the moment arm upon which the elastic cords 644 act. Correspondingly, if the elastic bands 644 are shifted to adjustment pins 648, 640 that are further from the central axis of the foot-deck 604, pivoting of the front wheel assembly 624 further expands the elastic cords 644 by a greater distance for each unit of angular displacement of the front wheel assembly 624, thereby increasing the effective centering force on the front wheel assembly 624 by increasing the length of the moment arm upon which the elastic cords 644 act.

The tension force exerted by the elastic cords can be increased by adding additional elastic cords, by increasing the path that they travel (such as by wrapping a portion of the elastic cords an extra time around the pins) and/or by selecting elastic cords having stronger or weaker resistance to extension.

Still further, in another alternative embodiment, the adjustment pins or hooks on the front wheel assembly and the foot-deck can be made to be adjustable towards or away from each other to differently pre-tension the elastic cords.

Other types of resilient tension members other than elastic cords can be employed.

The steering characteristic adjustment structure can be a steering range limiter that operates by limiting the pivoting range of the front wheel assembly relative to the foot-deck. For example, the front wheel assembly can be provided with adjustable features that abut into corresponding features of the foot-deck. The features can be, for example, posts that extend back towards the foot-deck and abut against the foot-deck on a side to which the vehicle is being turned to limit pivoting of the front wheel assembly beyond that orientation. The posts can be adjustable to adjust the pivoting range afforded to the front wheel assembly.

Persons skilled in the art will appreciate that there are yet more alternative implementations and modifications possible, and that the above examples are only illustrations of one or more implementations. The scope, therefore, is only to be limited by the claims appended hereto.

The invention claimed is:

1. A foot-deck-based vehicle having an adjustable steering characteristic, the foot-deck-based vehicle having a foot-deck with a front end, a rear end, and at least one rear wheel proximal to the rear end, comprising:
    a front wheel assembly coupled to the foot-deck proximal to the front end to pivot relative to the foot-deck about a front wheel assembly pivot axis that is at an acute angle to a vertical axis when the foot-deck-based vehicle is upright, the front wheel assembly comprising at least one front wheel rotatably coupled to a front wheel support; and
    a centering structure comprising at least one resilient torsion member that, when torsioned as a result of pivoting of the front wheel assembly, exerts a centering force biasing the front wheel assembly to a neutral steering position, the centering structure being adjustable by at least one of adding, removing, and replacing at least one of the at least one resilient torsion members, wherein each of the at least one resilient torsion member comprises a non-cylindrical recess that resists rotation relative to a peripheral surface of the resilient torsion member, generating a torsional force urging the non-cylindrical recess back to an initial angular orientation relative to the peripheral surface.

2. A foot-deck-based vehicle according to claim 1, wherein the at least one resilient torsion member couples the front wheel assembly to the foot-deck.

3. A foot-deck-based vehicle having an adjustable steering characteristic, the foot-deck-based vehicle having a foot-deck with a front end, a rear end, and at least one rear wheel proximal to the rear end, comprising:
    a front wheel assembly coupled to the foot-deck proximal to the front end to pivot relative to the foot-deck about a front wheel assembly pivot axis that is at an acute angle to a vertical axis when the foot-deck-based vehicle is upright, the front wheel assembly comprising a first front wheel and a second front wheel rotatably coupled to a front wheel support, the first front wheel being spaced apart laterally from the second front wheel; and
    a pitch adjustment structure configured to enable adjustment of a pitch of the front wheel assembly pivot axis relative to the vertical axis when the foot-deck-based vehicle is upright.

4. A foot-deck-based vehicle according to claim 3, wherein the pitch adjustment structure comprises a pivotable joint enabling the front wheel assembly to pivot relative to the foot-deck about a pitch pivot axis that is generally horizontal and perpendicular to a longitudinal axis of the foot-deck when the foot-deck-based vehicle is upright.

5. A foot-deck-based vehicle according to claim 4, wherein the pivotable joint is releasably lockable in one of a set of discrete pivot orientations.

6. A foot-deck-based vehicle according to claim 5, wherein the pivot joint comprises:
    at least one first barrel section coupled to the foot-deck and generally coaxial to the pitch pivot axis, the at least one first barrel section having a set of features on an inside surface thereof;
    at least one second barrel section coupled to the front wheel assembly and generally coaxial to the pitch pivot axis when the front wheel assembly is coupled to the foot-deck, the at least one second barrel section having a set of features on an inside surface thereof; and
    at least one locking member configured to be releasably lockably inserted through the at least one first barrel section and the at least one second barrel section to prevent pivoting of the front wheel assembly pivot axis relative to the foot-deck.

7. A foot-deck-based vehicle having an adjustable steering characteristic, the foot-deck-based vehicle having a foot-deck with a front end, a rear end, and at least one rear wheel proximal to the rear end, comprising:
    a front wheel assembly coupled to the foot-deck proximal to the front end to pivot relative to the foot-deck about a front wheel assembly pivot axis, the front wheel assembly comprising at least one front wheel rotatably coupled to a front wheel support; and a pivot range control structure adjustably controlling an effective pivot range of the front wheel assembly about the front wheel assembly pivot axis, wherein the pivot range control structure comprises at least one adjustable pivot-limiting structure extending from one of the front end of the foot-deck and the front wheel assembly and inhibiting pivoting of the front wheel assembly about the front wheel assembly pivot axis beyond the pivot range.

8. A foot-deck-based vehicle having an adjustable steering characteristic, the foot-deck-based vehicle having a foot-deck with a front end, a rear end, and at least one rear wheel proximal to the rear end, comprising, a front wheel assembly coupled to the foot-deck proximal to the front end to pivot relative to the foot-deck about a front wheel assembly pivot axis, the front wheel assembly comprising at least one front wheel rotatably coupled to a front wheel support; and a pivot range control structure adjustably controlling an effective pivot range of the front wheel assembly about the front wheel assembly pivot axis, wherein the pivot range control structure comprises at least one adjustable roll-limiting member extending from one of the front end of the foot-deck and the front wheel assembly and inhibiting rolling of the foot-deck relative to a travel surface upon which the foot-deck-based vehicle is situated.

* * * * *